United States Patent
Tsai

(10) Patent No.: US 9,188,812 B2
(45) Date of Patent: Nov. 17, 2015

(54) LIQUID CRYSTAL ALIGNMENT AGENT, LIQUID CRYSTAL ALIGNMENT FILM AND LIQUID CRYSTAL DISPLAY ELEMENT HAVING THEREOF

(71) Applicant: CHI MEI CORPORATION, Tainan (TW)

(72) Inventor: Tsung-Pei Tsai, Tainan (TW)

(73) Assignee: CHI MEI CORPORATION, Tainan (TW)

( * ) Notice: Subject to any disclaimer, the term of this patent is extended or adjusted under 35 U.S.C. 154(b) by 0 days.

(21) Appl. No.: 14/326,508

(22) Filed: Jul. 9, 2014

(65) Prior Publication Data

US 2015/0031829 A1  Jan. 29, 2015

(30) Foreign Application Priority Data

Jul. 23, 2013  (TW) .............. 102126311 A

(51) Int. Cl.
*G02F 1/1337* (2006.01)
*C08G 73/10* (2006.01)
*C08G 69/26* (2006.01)
*C08L 79/08* (2006.01)
*C08J 5/18* (2006.01)

(52) U.S. Cl.
CPC .......... *G02F 1/133723* (2013.01); *C08G 73/10* (2013.01); *C08J 5/18* (2013.01); *C08L 79/08* (2013.01); *C08J 2379/08* (2013.01)

(58) Field of Classification Search
None
See application file for complete search history.

(56) References Cited

FOREIGN PATENT DOCUMENTS

| CN | 1807551 A | 7/2006 |
| EP | 0 503 918 A1 * | 9/1992 |
| EP | 0 840 161 A1 * | 5/1997 |
| JP | 2893671 B2 | 5/1999 |
| TW | 200951583 A | 12/2009 |
| TW | 201343718 A | 11/2013 |
| TW | 201404802 A | 2/2014 |

OTHER PUBLICATIONS

Ziad Ali-Adib et al. Examples of amphitropic polymers: monolayer film, Langmuir-Blodgett film, and liquid-crystalline properties of some polymeric amphiphiles containing cholestanol moieties and those of some closely related non-polymeric amphiphiles. J. Mater. Chem. 1996, 6(1), 15-22.*

* cited by examiner

Primary Examiner — Susannah Chung
Assistant Examiner — Robert T Butcher
(74) Attorney, Agent, or Firm — CKC & Partners Co., Ltd.

(57) ABSTRACT

The present invention relates to a liquid crystal alignment agent, a liquid crystal alignment film made by the liquid crystal alignment agent and a liquid crystal display element having the liquid crystal alignment film. The liquid crystal alignment agent includes a polymer (A) and a solvent (B). The polymer (A) is synthesized by reacting a mixture that includes a tetracarboxylic dianhydride compound (a) and a diamine compound (b). According to the specific diamine compound (b) and an amount of the same, the aforementioned liquid crystal alignment agent has better pretilt angle stability.

6 Claims, 1 Drawing Sheet

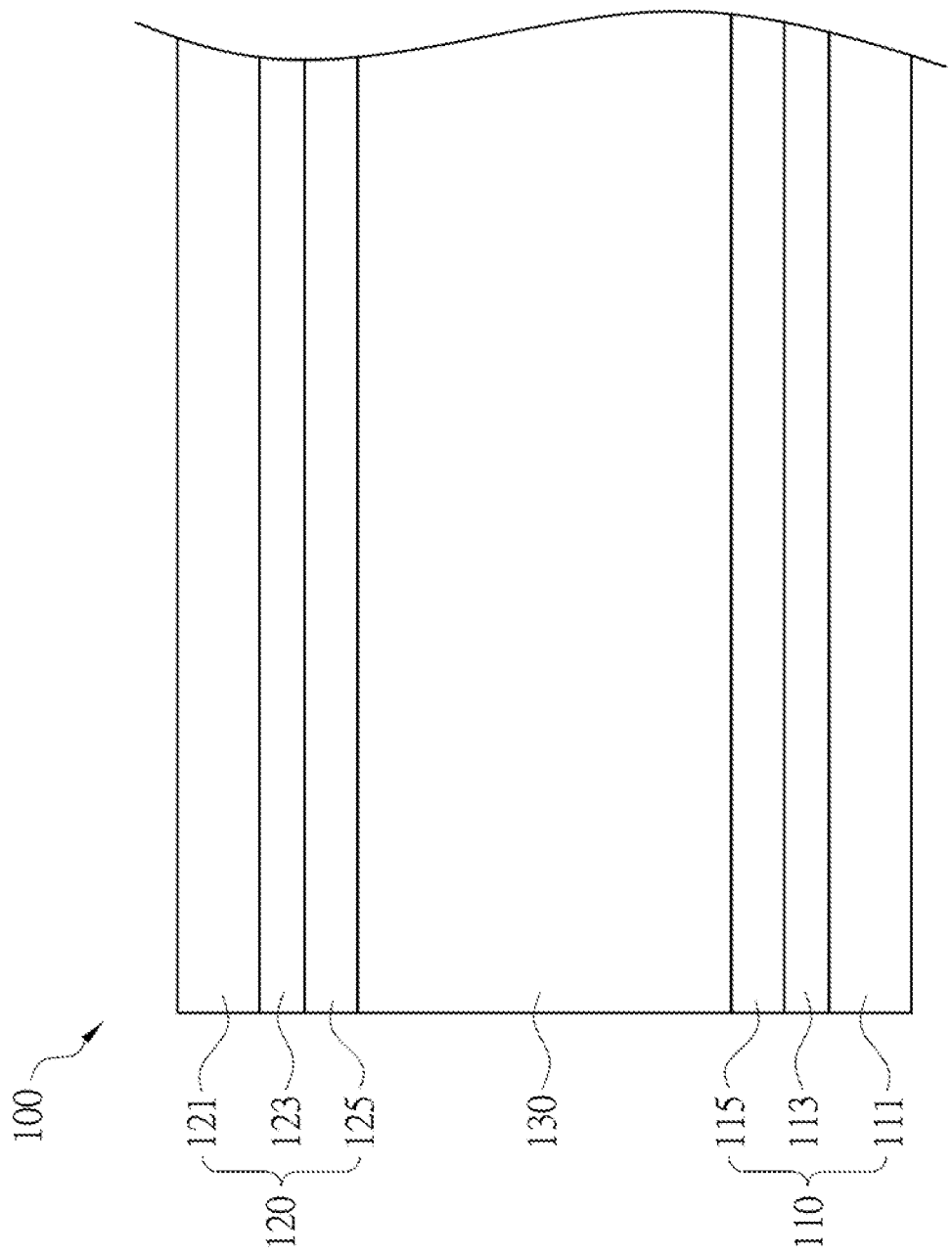

LIQUID CRYSTAL ALIGNMENT AGENT, LIQUID CRYSTAL ALIGNMENT FILM AND LIQUID CRYSTAL DISPLAY ELEMENT HAVING THEREOF

RELATED APPLICATIONS

This application claims priority to Taiwan Application Serial Number 102126311, filed on Jul. 23, 2013, which is herein incorporated by reference.

BACKGROUND

1. Field of Invention

The present invention relates to a liquid crystal alignment agent, a liquid crystal alignment film and a liquid crystal display element having thereof. More particularly, the present invention relates a liquid crystal alignment agent that has excellent pretilt angle stability, a liquid crystal alignment film formed by the liquid crystal alignment agent, and a liquid crystal display element comprises the liquid crystal alignment film.

2. Description of Related Art

In recent years, there is a requirement of the wide view angle of the liquid crystal display element, thus the requirements of the electrical properties and display properties have become stricter. In wide view angle liquid crystal display element, the vertical alignment liquid crystal display element is widely studied. For meeting better electrical properties and display properties, liquid crystal alignment film becomes one of the important factors.

The liquid crystal alignment film of the vertical alignment liquid crystal display element is used to regularly align the liquid crystal molecules with a larger pretilt angle when the electrical field is not applied. For producing the aforementioned liquid crystal alignment film, a liquid crystal alignment agent having polymers such as polyamic acid or polyimide is firstly coated on a surface of the substrate, being subjected to a thermal treatment and an alignment treatment, thereby obtaining the liquid crystal alignment film.

JP Patent No. 2893671 discloses a polyimide for producing the liquid crystal alignment agent of vertically aligned liquid crystal display element. The polyimide is synthesized by polymerizing a tetracarboxylic dianhydride compound and a diamine compound having a cholesterol skeleton.

The aforementioned liquid crystal alignment film can keep the liquid crystal molecules at 88° to 89° of the high pretilt angle to achieve excellent liquid crystal alignment properties. However, the liquid crystal alignment film still has a defect of lower pretilt angle stability, thereby drastically reducing the display quality of the liquid crystal display element.

Accordingly, there is a need to improve the aforementioned disadvantages for meeting the requirements of the liquid crystal alignment agent.

SUMMARY

Therefore, an aspect of the present invention provides a liquid crystal alignment agent. The liquid crystal alignment agent comprises a polymer (A) and a solvent (B). The liquid crystal alignment agent has better pretilt angle stability.

Another aspect of the present invention provides a liquid crystal alignment film. The liquid crystal alignment film is formed by the aforementioned liquid crystal alignment agent.

A further aspect of the present invention provides a liquid crystal display element. The liquid crystal display element includes the aforementioned liquid crystal alignment film.

The liquid crystal alignment agent comprising the polymer (A) and the solvent (B) all of which are described in details as follows.

Polymer (A)

The polymer (A) is selected from the group consisting of polyamic acid, polyimide, polyimide series block-copolymer and a combination thereof. The polyimide series block-copolymer is selected from the group consisting of polyamic acid block-copolymer, polyimide block-copolymer, polyamic acid-polyimide block-copolymer and a combination thereof.

The polyamic acid, polyimide, and polyimide series block-copolymer of the polymer (A) all synthesized by reacting a mixture that includes a tetracarboxylic dianhydride compound (a) and a diamine compound (b). The tetracarboxylic dianhydride compound (a), the diamine compound (b) and a method of producing the polymer (A) all of which are described in details as follows.

Tetracarboxylic Dianhydride Compound (a)

The tetracarboxylic dianhydride compound (a) can be selected from the group consisting of an aliphatic tetracarboxylic dianhydride compound, an alicyclic tetracarboxylic dianhydride compound, an aromatic tetracarboxylic dianhydride compound, the tetracarboxylic dianhydride compound (a) having a structure of formula (IV-1) to (IV-6) and the like.

For example, the aliphatic tetracarboxylic dianhydride compound includes but is not limited tetracarboxylic dianhydride ethane, tetracarboxylic dianhydride butane and the like.

For example, the alicyclic tetracarboxylic dianhydride compound includes but is not limited 1,2,3,4-cyclobutane tetracarboxylic dianhydride, 1,2-dimethyl-1,2,3,4-cyclobutane tetracarboxylic dianhydride, 1,3-dimethyl-1,2,3,4-cyclobutane tetracarboxylic dianhydride, 1,3-dichloro-1,2,3,4-cyclobutane tetracarboxylic dianhydride, 1,2,3,4-tetramethyl-1,2,3,4-cyclobutane tetracarboxylic dianhydride, 1,2,3,4-cyclopentane tetracarboxylic dianhydride, 1,2,4,5-cyclohexane tetracarboxylic dianhydride, 3,3',4,4'-dicyclohexane tetracarboxylic dianhydride, cis-3,7-dibutylcycloheptyl-1,5-diene-1,2,5,6-tetracarboxylic dianhydride, 2,3,5-tricarboxy cyclopentyl acetic acid dianhydride, dicyclo[2.2.2]-octyl-7-ene-2,3,5,6-tetracarboxylic dianhydride and the like.

For example, the aromatic tetracarboxylic dianhydride compound includes but is not limited 3,4-dicarboxy-1,2,3,4-tetrahydronaphthalene-1-succinic acid dianhydride, pyromellitic dianhydride, 2,2',3,3'-benzophenone tetracarboxylic dianhydride, 3,3',4,4'-benzophenone tetracarboxylic dianhydride, 3,3',4,4'-biphenylsulfone tetracarboxylic dianhydride, 1,4,5,8-naphthalene tetracarboxylic dianhydride, 2,3,6,7-naphthalene tetracarboxylic dianhydride, 3,3',4,4'-diphenylethane tetracarboxylic dianhydride, diphenylsilane tetracarboxylic dianhydride, 3,3',4,4'-tetraphenylsilane tetracarboxylic dianhydride, 1,2,3,4-furan tetracarboxylic dianhydride, 2,3,3',4'-biphenyl ether tetracarboxylic dianhydride, 3,3',4,4'-biphenylether tetracarboxylic dianhydride, 4,4'-bis(3,4-dicarboxyphenoxy)diphenylsulfide dianhydride, 2,3,3',4'-biphenylsulfide tetracarboxylic dianhydride, 3,3',4,4'-biphenylsulfide tetracarboxylic dianhydride, 4,4'-bis(3,4-dicarboxyphenoxyl)diphenylsulfone dianhydride, 4,4'-bis(3,4-dicarboxyphenoxyl)diphenylpropane dianhydride, 3,3'4,4'-perfluoroisopropylidene diphenyl dicarboxylic dianhydride, 2,2'3,3'-biphenyl tetracarboxylic dianhydride, 2,3,3'4'-biphenyl tetracarbxylic dianhydride, 3,3',4'-biphenyl tetracarboxylic dianhydride, bis(phthalic acid)phenylphosphine oxide dianhydride, p-phenylene-bis(triphenyl phthalic acid)dianhydride, m-phenylene-bis(triphenylphthalic acid) dianhydride, bis(triphenylphthalic acid)-4,4'-diphenyl ether dianhydride, bis(triphenylphthalic acid)-4,4'-diphenyl methane dianhydride, ethylene glycol-bis(anhydrotrimelitate), propylene glycol-bis(anhydrotrimelitate), 1,4-butanediol bis(anhydrotrimelitate), 1,6-hexanediol bis(anhydrotrimelitate), 1,8-octanediol bis(anhydrotrimelitate), 2,2-bis(4'-hydroxyphenyl)propane-bis(anhydrotrimelitate), 2,3,4,5-tetrahydrofurantetracarboxylic dianhydride, 1,3,3a,4,5,9b-Hexahydro-5-(tetrahydro-2,5-dioxofuran-3-yl)naphtho[1,2-c]furan-1,3-dione, 1,3,3a,4,5,9b-Hexahydro-5-methyl-5-(tetrahydro-2,5-dioxofuran-3-yl)naphtho[1,2-c]furan-1,3-dione, 1,3,3a,4,5,9b-Hexahydro-5-ethyl-5-(tetrahydro-2,5-dioxofuran-3-yl)naphtho[1,2-c]furan-1,3-dion, 3,3-a,4,5,9b-Hexahydro-7-methyl-5-(tetrahydro-2,5-dioxofuran-3-yl) naphtho[1,2-c]furan-1,3-dione, 1,3,3a,4,5,9b-Hexahydro-7-ethyl-5-(tetrahydro-2,5-dioxofuran-3-yl)naphtho[1,2-c]furan-1,3-dione, 1,3,3a,4,5,9b-Hexahydro-5,8-methyl-5-(tetrahydro-2,5-dioxofuran-3-yl)naphtho[1,2-c]furan-1,3-dione, 1,3,3-a,4,5,9b-Hexahydro-5,8-dimethyl-5-(tetrahydro-2, dioxofuran-3-yl)naphtho[1,2-c]furan-1,3-dione, 1,3,3-a,4,5,9b-Hexahydro-5,8-dimethyl-5-(tetrahydro-2,5-dioxofuran-3-yl)naphtho[1,2-c]furan-1,3-dione, 5-(2,5-dioxotetrahydrofuran)-3-methyl-3-cyclohexene-1,2-dicarboxylic dianhydride and the like.

The tetracarboxylic dianhydride compound (a having a structure of formula (IV-1) to (IV-6) all of which are showed as follow

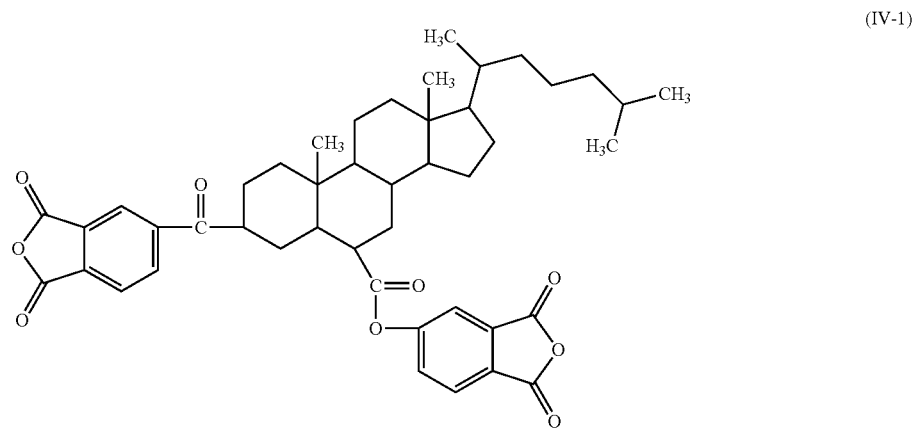

(IV-1)

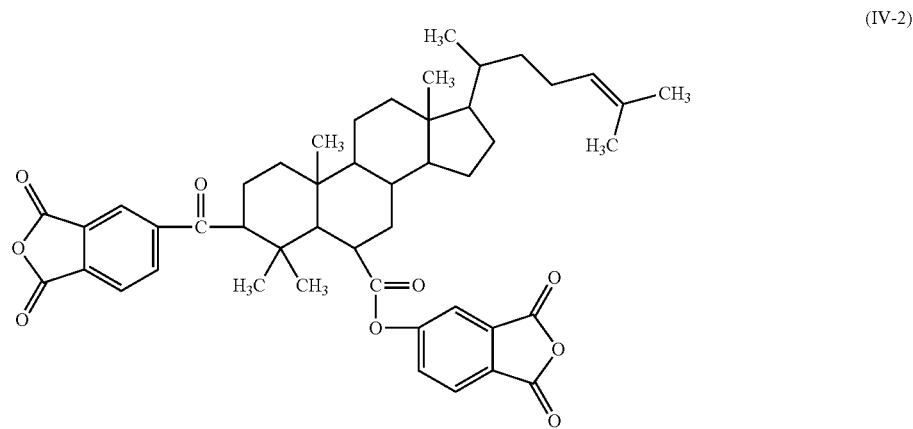

(IV-2)

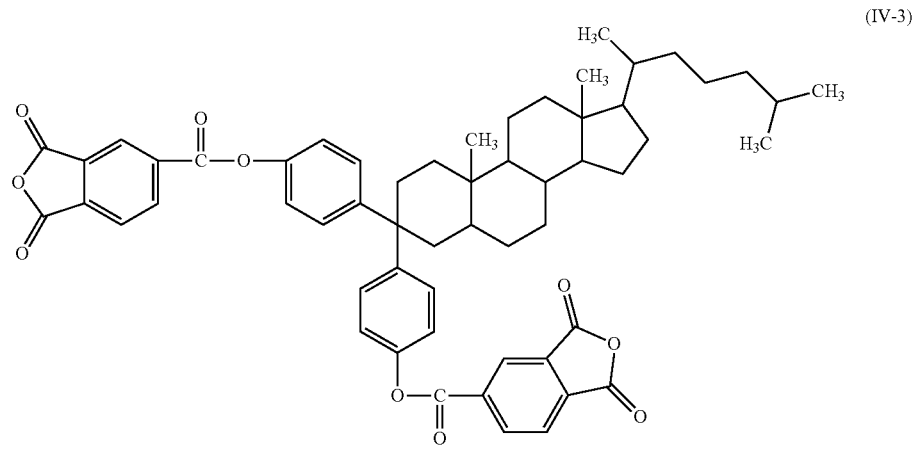

(IV-3)

-continued

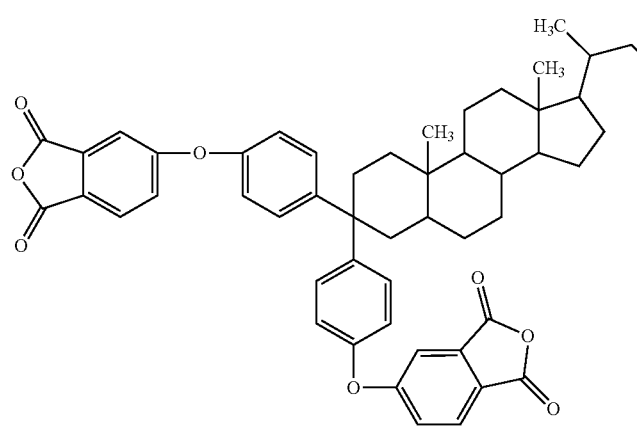
(IV-4)

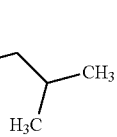

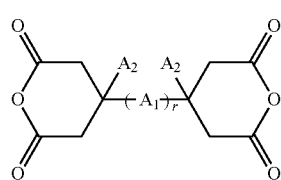
(IV-5)

In formula (IV-5), $A_1$ is a divalent group having an aromatic group; r is an integer of 1 or 2; $A_2$ and $A_3$ can be the same or different, and $A_2$ and $A_3$ respectively are a hydrogen atom or alkyl group. Preferably, the tetracarboxylic dianhydride compound (a) having a structure of formula (IV-5) can be selected from the group consisting of a compound having a structure of formula (IV-5-1) to (IV-5-3):

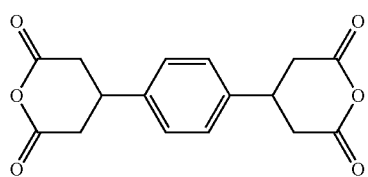
(IV-5-1)

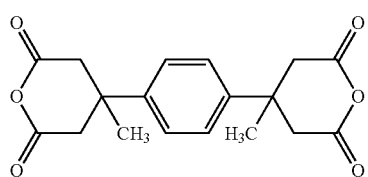
(IV-5-2)

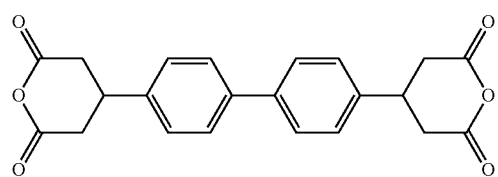
(IV-5-3)

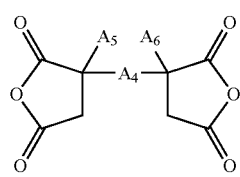
(IV-6)

In formula (IV-6), $A_4$ is a divalent group having an aromatic group; $A_5$ and $A_6$ can be the same or different, and $A_5$ and $A_6$ respectively are a hydrogen atom or alkyl. Preferably, the tetracarboxylic dianhydride compound (a) having a structure of formula (IV-6) can be selected from the group consisting of the compound having a structure of formula (IV-6-1):

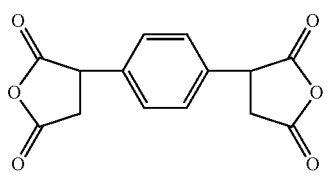
(IV-6-1)

The aforementioned tetracarboxylic dianhydride compound can be used alone or a combination two or more. Preferably, the tetracarboxylic dianhydride compound (a) includes but is not limited 1,2,3,4-cyclobutane tetracarboxylic dianhydride, 1,2,3,4-cyclopentane tetracarboxylic dianhydride, 2,3,5-tricarboxy cyclopentyl acetic acid dianhydride, 1,2,4,5-cyclohexane tetracarboxylic dianhydride, 3,4-dicarboxy-1,2,3,4-tetrahydronaphthalene-1-succinic acid dianhydride, pyromellitic dianhydride, 3,3',4,4'-benzophenone tetracarboxylic dianhydride and 3,3',4,4'-biphenylsulfone tetracarboxylic dianhydride.

Diamine Compound (b)

The diamine compound (b) includes a diamine compound (b-1) having a structure of formula (I) and an other diamine compound (b-2).

Diamine Compound (b4)

The diamine compound (b-1) has a following structure of formula (I):

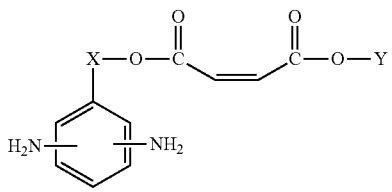
(I)

in the formula (I), X is an alkylene group of 1 to 12 carbons. Y is a steroid-containing group or a structure of formula (II):

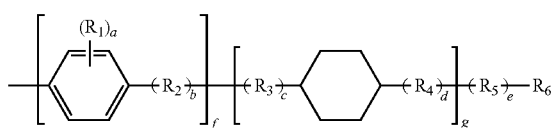
(II)

in the formula II), R is a hydrogen atom, a fluoro atom or a methyl group. $R_2$, $R_3$ and $R_4$ respectively are a single bond,

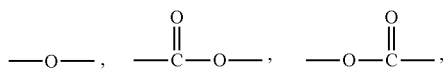

or an alkylene group of 1 to 3 carbons. $R_5$ is and $R_7$ and $R_8$ respectively are a hydrogen atom, a fluoro atom or a methyl group. $R_6$ is a hydrogen atom, a fluoro atom, an alkyl group of 1 to 12 carbons, a fluoroalkyl group of 1 to 12 carbons, an alkoxyl group of 1 to 12 carbons, —$OCH_2F$, —$OCHF_2$ or —$OCF_3$, a is 1 or 2. b, c and d respectively are an integer of 0 to 4. e, f and g respectively are an integer of 0 to 3, and $e+f+g \geq 1$. h and i respectively are 1 or 2. When a is more than 1, a plurality of $R_1$ is the same or different, and ditto for a plurality of $R_2$, $R_3$, $R_4$, $R_5$, $R_7$ and $R_8$ respectively when b, e, d, e, h and i are more than 1.

For example, the diamine compound (b-1) includes following diamine compounds having a structure of formula (I-1) to (I-16):

(I-1)

(I-2)

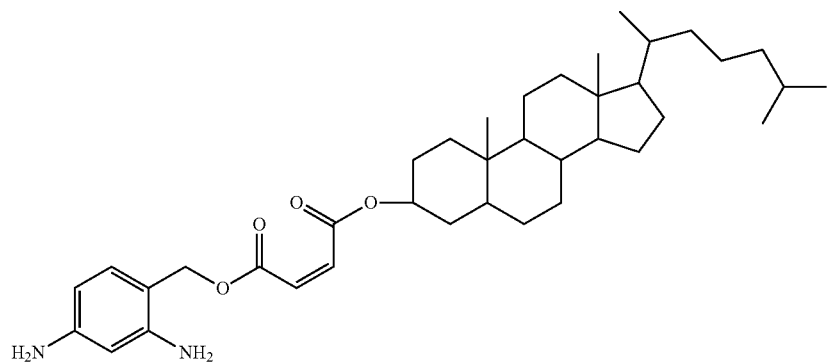
(I-3)
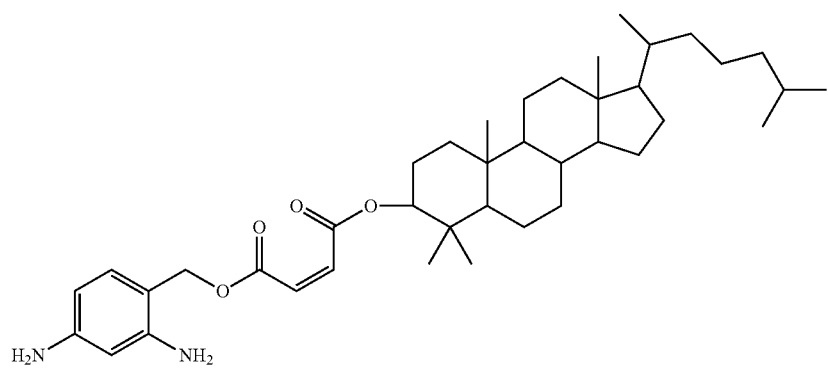
(I-4)
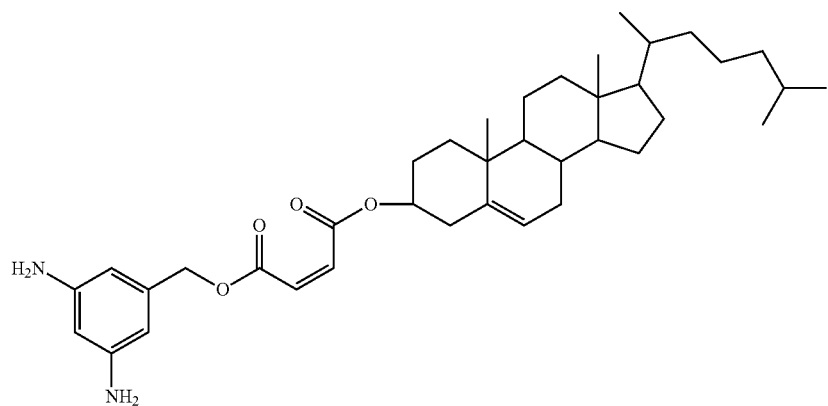
(I-5)
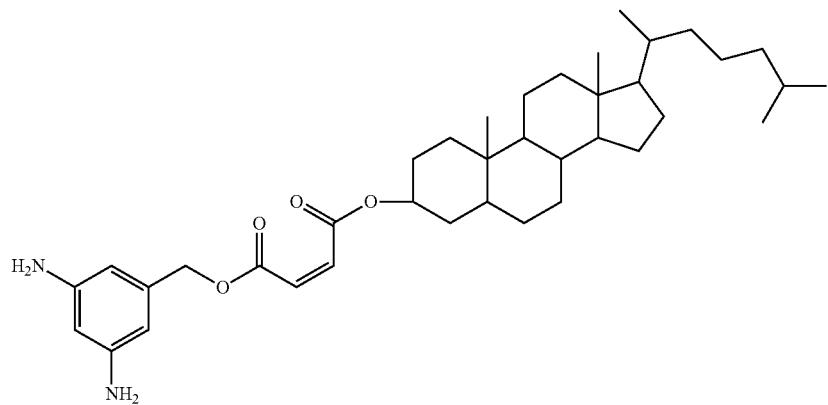
(I-6)

-continued
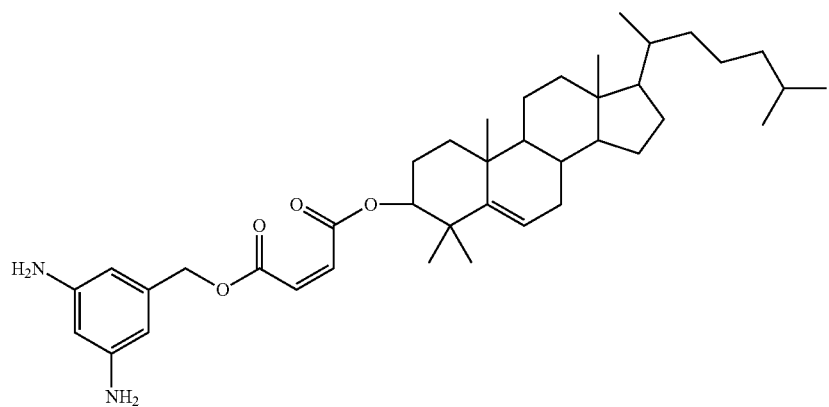
(I-7)
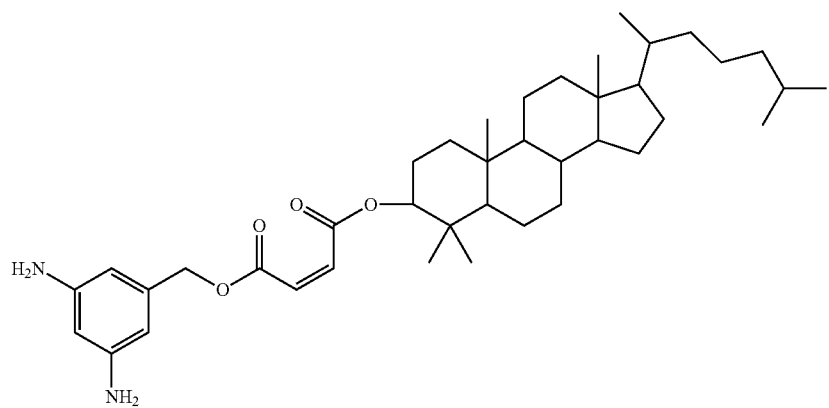
(I-8)
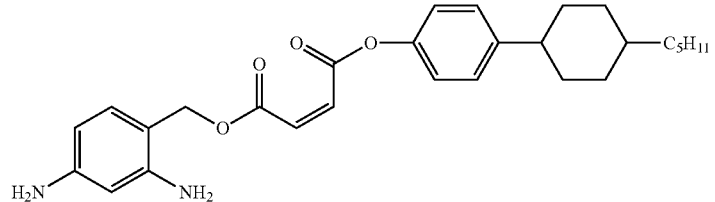
(I-9)
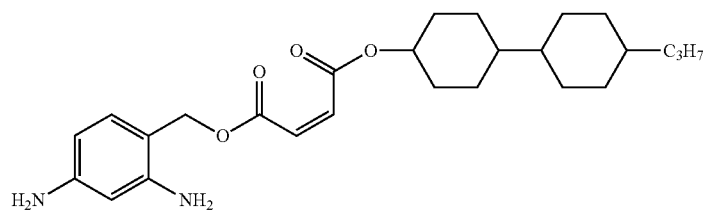
(I-10)
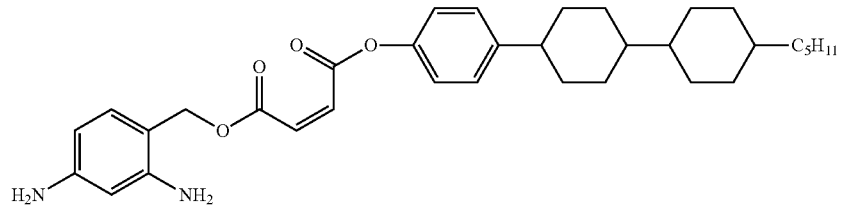
(I-11)

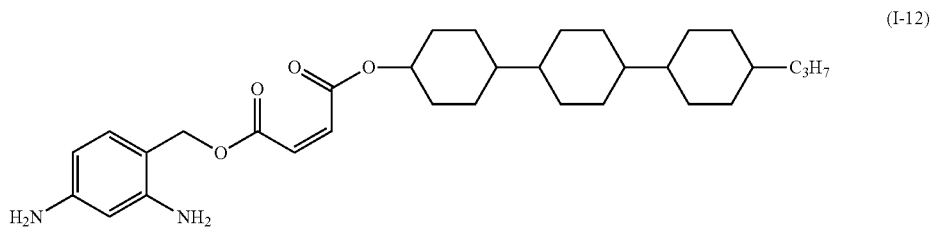
(I-12)

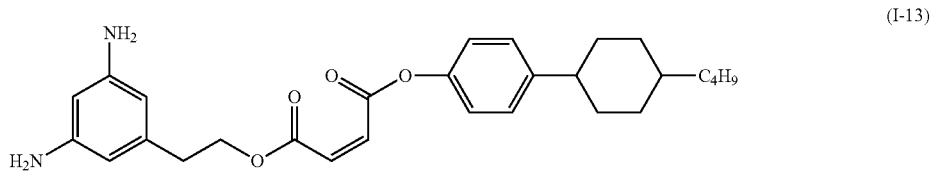
(I-13)

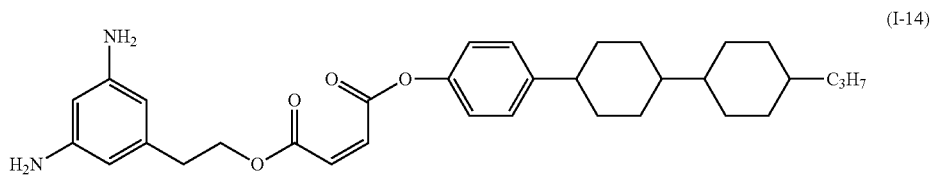
(I-14)

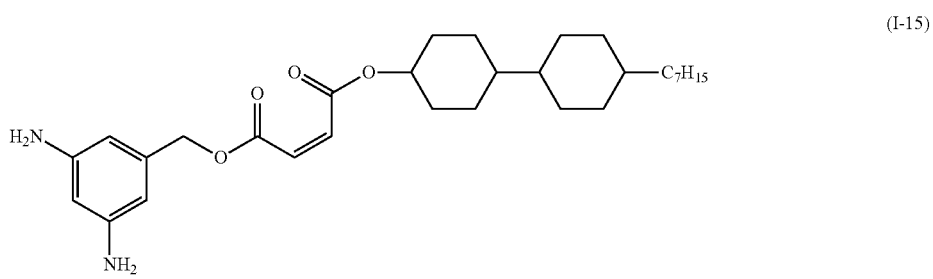
(I-15)

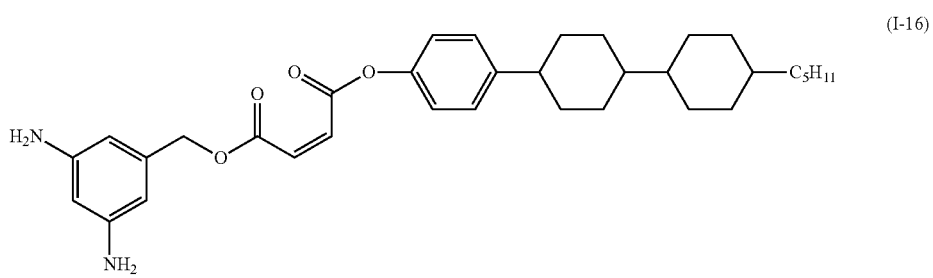
(I-16)

The aforementioned diamine compound (b-1) can be used alone or a combination thereof. The diamine compound (b-1) can be produced by general organic synthetic method. For example, after maleic anhydride is bonded to a steroid-containing compound or a following compound having a structure of formula (I-17) by an addition reaction, dinitrobenzoyl chloride compound is subjected to an esterification reaction with potassium carbonate. Then, a suitable reductant, such as stannic chloride and the like, is added, and a reducing reaction is performed to obtain the aforementioned diamine compound (b-1) having a structure of formula (I-1) to (I-16):

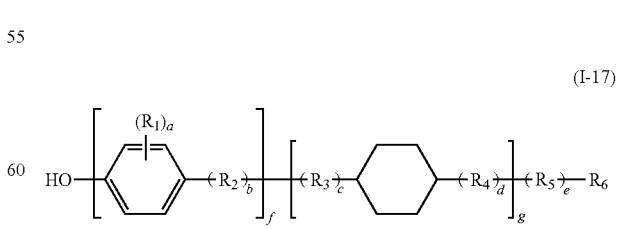
(I-17)

in the formula (I-17), $R_1$, $R_2$, $R_3$, $R_4$, $R_5$, $R_6$, a, b, c, d, e, f and g are the same as above.

The compound having a structure of formula (I-17) can be synthesized by general methods for synthesizing liquid crystal compound, such as Grignard reaction, Friedal-Crafts acylation reaction and the like.

Based on the diamine compound (b) as 100 moles, an amount of the diamine compound (b-1) is 5 moles to 40 moles, preferably is 8 moles to 35 moles, and more preferably is 10 moles to 30 moles.

When the polymer (A) in the liquid crystal alignment agent does not include the diamine compound (b-1) having a structure of formula (I), the liquid crystal alignment agent has a defect of lower pretilt angle stability.

Other Diamine Compound (b-2)

The other diamine compound (b-2) includes but is not limited 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 4,4'-diaminoheptane, 1,3-diamino-2,2-dimethylpropane, 1,6-diamino-2,5-dimethylhexane, 1,7-diamino-2,5-dimethylheptane, 1,7-diamino-4,4-dimethylheptane, 1,7-diamino-3-methylheptane, 1,9-diamino-5-methylnonane, 2,1-diaminododecane, 1,12-diaminooctadecane, 1,2-bis(3-aminopropoxyl)ethane, 4,4'-diaminodicyclohexylmethane, 4,4'-diamino-3,3'-dimethyldicyclohexylamine, 1,3-diaminocyclohexane, 1,4-diaminocyclohexane, isophoronediamine, tetrahydrodicyclopentadiene diamine, tricyclo(6.2.1.0$^{2,7}$)-undecenoyl dimethyldiamine, 4,4'-methylenebis(cyclohexylamine), 4,4'-diaminodiphenylmethane, 4,4'-diaminodiphenylethane, 4,4'-diaminodiphenylsulfone, 4,4'-diaminobenzanilide, 4,4'-diaminodiphenylether, 3,4'-diaminodiphenylether, 1,5-diaminonaphthalene, 5-amino-1-(4'-aminophenyl)-1,3,3-trimethylindane, 6-amino-1-(4-aminophenyl)-1,3,3-trimethylindane, hexahydro-4,7-methnoindanylenediethylenediamine, 3,3'-diaminobenzophenone, 3,4'-diaminobenzophenone, 4,4'-diaminobenzophenone, 2,2-bis[4-(4-aminophenoxy)phenyl]propane, 2,2-bis[4-(4-aminophenoxy)phenyl]hexafluoropropane, 2,2-bis(4-aminophenyl)hexafluoropropane, 2,2-bis[4-(4-aminophenoxy)phenyl]sulfone, 1,4-bis(4-aminophenoxyl)benzene, 1,3-bis(4-aminophenoxy)benzene, 1-bis(3-aminophenoxyl)benzene, 9,9-bis(4-am nophenyl)-10-hydroanthracene, 9,10-bis(4-aminophenyl)anthracene, 2,7-diaminofluorene, 9,9-bis(4-aminophenyl)fluorene, 4,4'-methylene-bis(2-chloroaniline), 4,4'-(p-phenyleneisopropylene)bisaniline, 4,4'-(m-phenylene isopropylene)bisaniline, 2,2'-bis[4-(4-amino-2-trifluoromethy phenoxy)phenyl]hexafluoropropane, 4,4'-bis[(4-amino-2-trifluoro)phenoxy]octafluorophenyl benzene, 5-[4-(4-n-pentylcyclohexyl)cyclohexyl]phenylmethylene-1,3-diaminobenzene, 1,1-bis[4-(4-aminophenoxy)phenyl]-4-(4-ethylphenyl)cyclohexane, and the other diamine compound (b-2) having a structure of formula (III-1) to (III-26

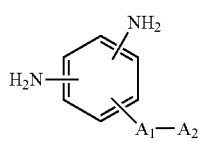
(III-1)

In the formula (III-1), A$^1$ is

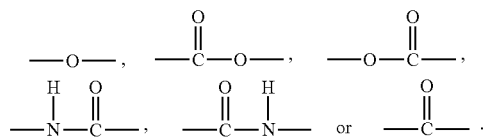

A$_2$ is a steroid-containing group, a trifluoro methyl group, a fluoro group, an alkyl group of 2 to 30 carbons or an monovalent nitrogen-containing cyclic group derived from pyridine, pyrimidine, triazine, piperidine, piperazine and the like.

Preferably, the diamine compound having a structure of formula (III-1) is 2,4-diaminophenyl ethyl formate, 3,5-diaminophenyl ethyl formate, 2,4-diaminophenyl propyl formate, 3,5-diaminophenyl propyl formate, 1-dodecoxy-2,4-diaminobenzene, 1-hexadecoxy-2,4-diaminobenzene, 1-octadecoxy-2,4-diaminobenzene or the diamine compound (b-2) having a structure of formula (III-1-1) to (III-1-6):

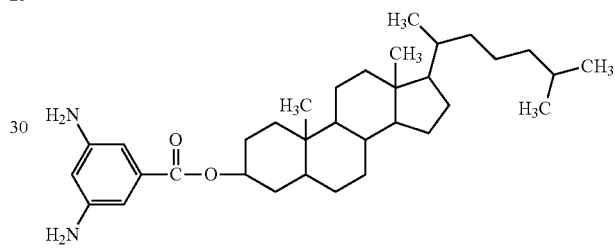
(III-1-1)

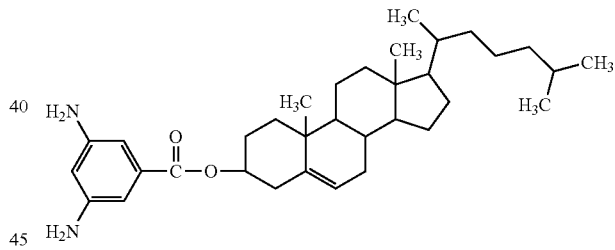
(III-1-2)

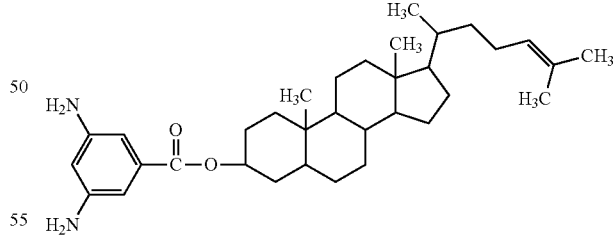
(III-1-3)

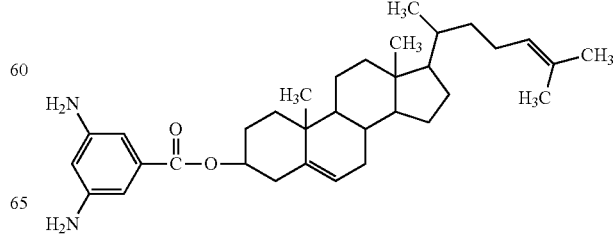
(III-1-4)

-continued

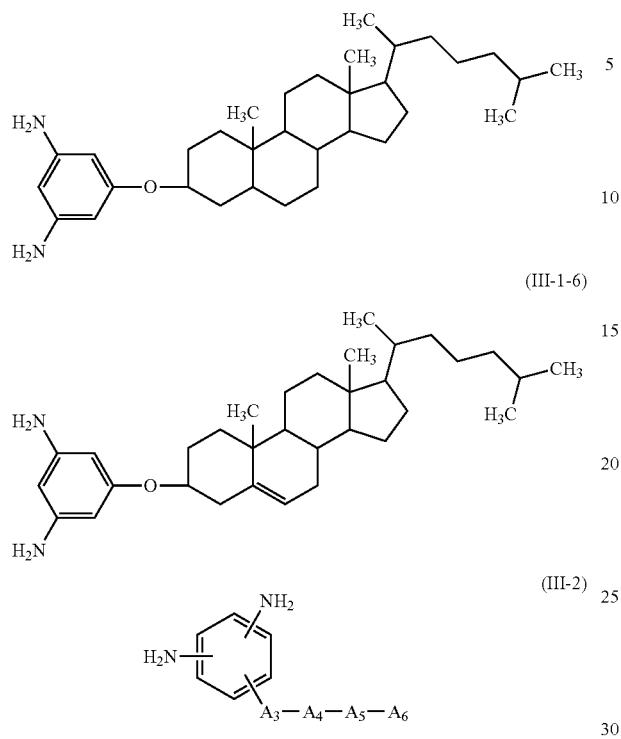

in the formula (III-2). $A_3$ is

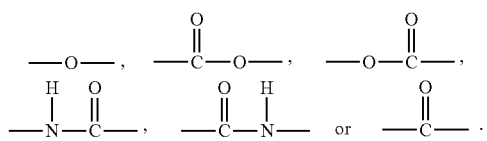

$A_4$ and $A_5$ is a divalent group of an alicyclic ring, an aromatic ring or a heterocyclic ring. $A_6$ is an alkyl group of 3 to 18 carbons, an alkoxyl group of 3 to 18 carbons, a fluoroalkyl group of 1 to 5 carbons, a fluoroalkoxyl group of 1 to 5 carbons, a cyano group or a halogen atom.

Preferably, the other diamine compound having a structure of formula (III-2) is the diamine compound having a structure of formula (III-2-1) to (III-2-13):

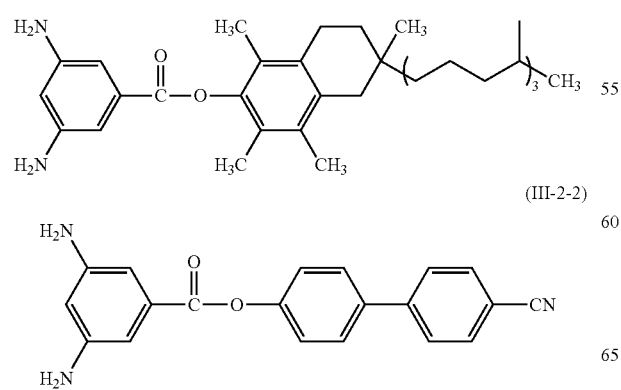

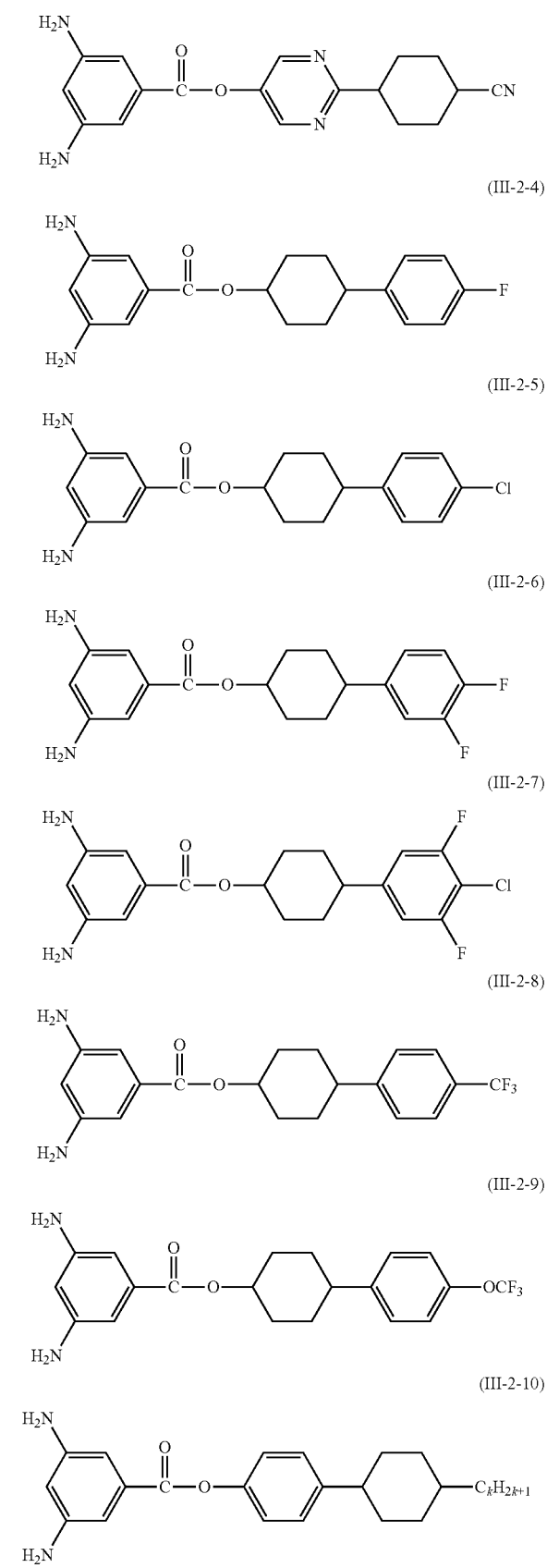

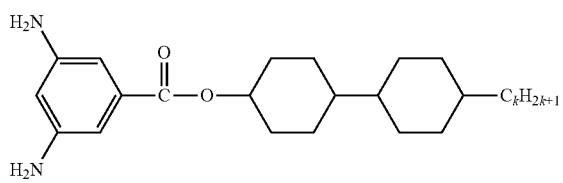
(III-2-11)

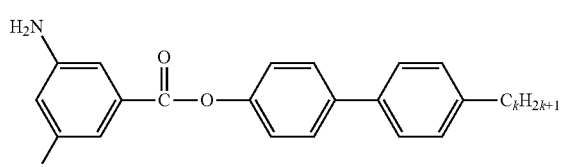
(III-2-12)

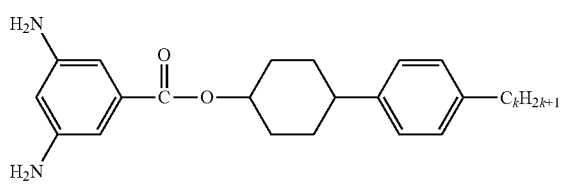
(III-2-13)

in the formula (III-2-10) to (III-2-13), s is an integer of 3 to 12.

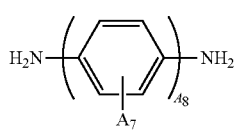
(III-3)

in the formula (III-3), $A_7$ is a hydrogen atom, an acyl group of 1 to 5 carbons, an alkyl group of 1 to 5 carbons, an alkoxyl group of 1 to 5 carbons, or a halogen atom. In every repeating unit, $A_7$ can be the same or different. $A_8$ is an integer of 1 to 3.

The diamine compound having a structure of formula (III-3) preferably is selected from the group consisting of (1) when $A_8$ is 1, such as p-diaminobenzene, m-diaminobenzene, o-diaminobenzene, 2,5-diaminotoluene and the like; (2) when $A_8$ is 2, such as 4,4'-diaminobiphenyl, 2,2'-dimethyl-4,4'-diaminobiphenyl, 3,3'-dimethyl-4,42-diaminobiphenyl, 3,3'-dimethoxy-4,4'-diaminobiphenyl, 3,3'-dichloro-4,4'-diaminobiphenyl, 2,2',5,5'-tetrachloro-4,4'-diaminobiphenyl, 2,2'-dichloro-4,4'-diamino-5,5'-dimethoxybiphenyl, 4,4'-diamino-2,2'-bis(trichloromethyl)biphenyl and the like; (3) when $A_8$ is 3, such as 1,4-bis(4'-aminophenyl)benzene and the like, and more preferably is p-diaminobenzene, 2,5-diaminotoluene, 4,4'-diaminobiphenyl, 3,3'-dimethoxy-4,4'-diaminobiphenyl or 1,4-bis(4'-aminophenyl)benzene.

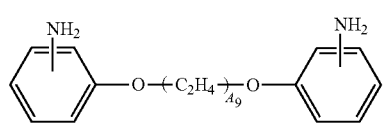
(III-4)

In the formula (III-4), $A_9$ is an integer of 2 to 12.

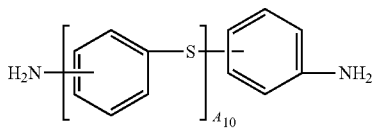
(III-5)

In the formula (III-5), $A_{10}$ is an integer of 1 to 5. Preferably, the formula (III-5) is selected from 4,4'-diamino-diphenyl-sulfide,

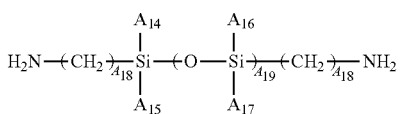
(III-6)

In the formula (III-6), $A_{11}$ and $A_{13}$ can be the same or different, and $A_{11}$ and $A_{13}$ respectively are divalent group; $A_{12}$ is a divalent nitrogen-containing cyclic group derived from pyridine, pyrimidine, triazine, piperidine, piperazine and the like.

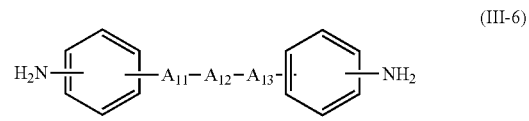
(III-7)

In the formula (III-7), $A_{14}$, $A_{15}$, $A_{16}$ and $A_{17}$ respectively can be the same or different, and $A_{14}$, $A_{15}$, $A_{16}$ and $A_{17}$ respectively are an alkyl group of 1 to 12 carbons. $A_{15}$ is an integer of 1 to 3, and $A_{19}$ is an integer of 1 to 20.

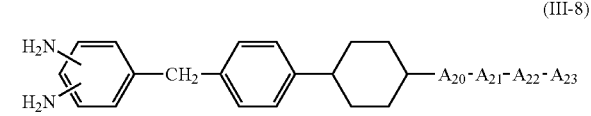
(III-8)

In the formula (III-8), $A_{20}$ is —O— or a cyclohexylene. $A_{21}$ is —CH$_2$—. $A_{22}$ is phenylene or cyclohexylene, $A_{23}$ is a hydrogen atom or a heptyl.

Preferably, the diamine compound having a structure of formula (III-8) is selected from the group consisting of the diamine compound having a structure of formula (III-8-1) to (III-8-2):

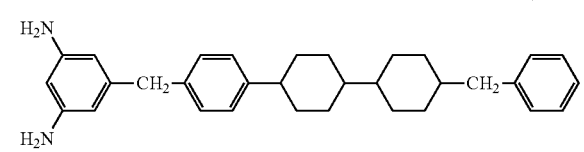
(III-8-1)

(III-8-2)
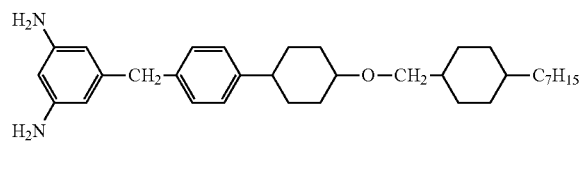
The other diamine compound having a structure of formula (III-9) to (III-25) are showed as follows:
(III-9)
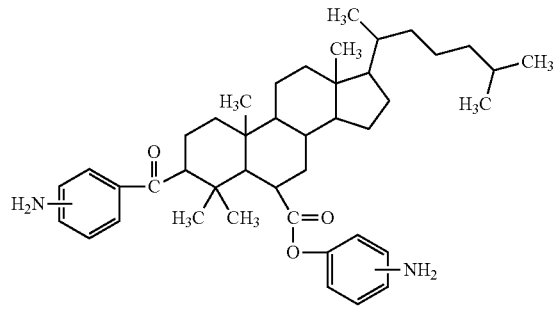
(III-10)
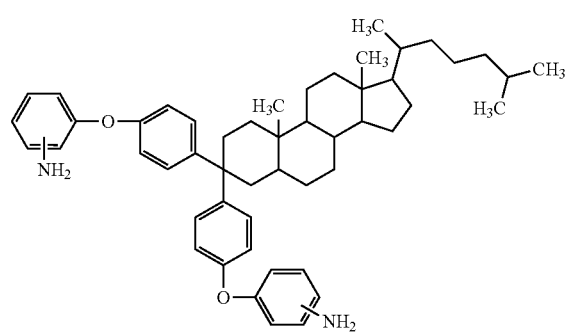
(III-11)
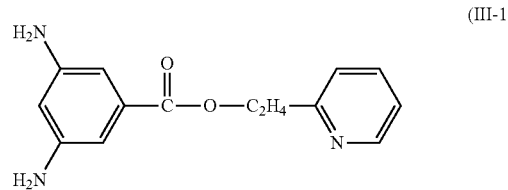
(III-12)
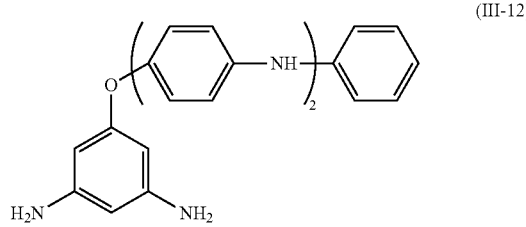
(III-13)
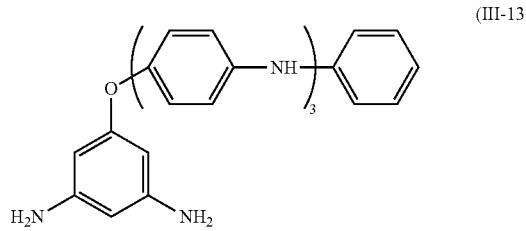
(III-14)
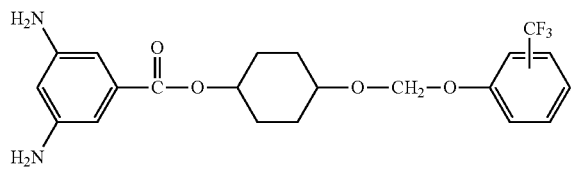
(III-15)
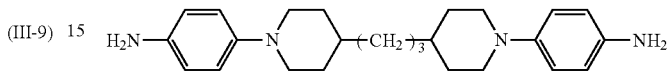
(III-16)
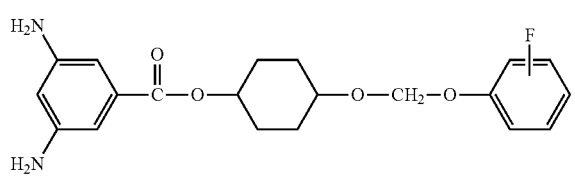
(III-17)
(III-18)
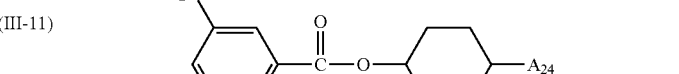
(III-19)
(III-20)

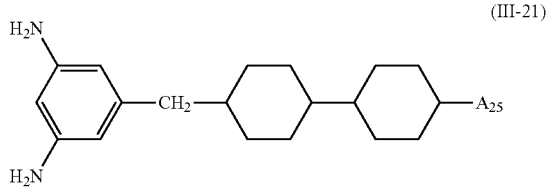
(III-21)

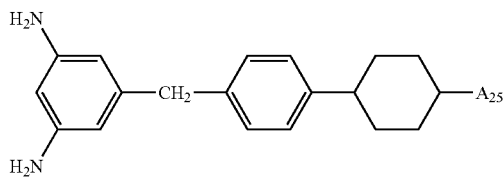
(III-22)

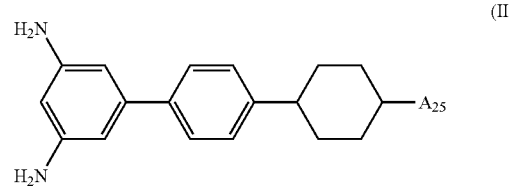
(III-23)

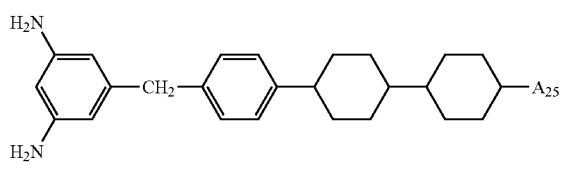
(III-24)

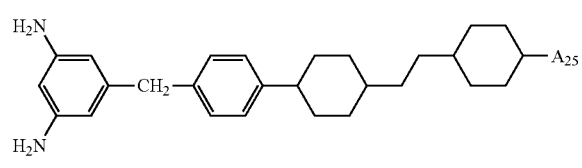
(III-25)

in the formula (III-17) to (III-25), $A_{24}$ preferably is an alkyl group of 1 to 10 carbons, or an alkoxyl group of 1 to 10 carbons. $A_{25}$ preferably is a hydrogen atom, an alkyl group of 1 to 10 carbons, or an alkoxyl group of 1 to 10 carbons.

The diamine compound having a structure of formula (III-26) is shown as follows:

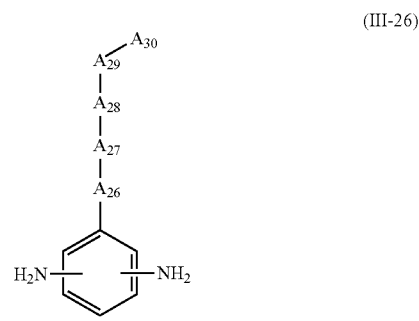
(III-26)

in the formula (III-26), $A_{26}$ is a single bond, a methylene group or an ethylene group. $A_{27}$ and $A_{29}$ can be the same or different, and $A_{27}$ and $A_{29}$ respectively are an ether group, a thioether group, a thioester group and an ester group. $A_{28}$ is an alkylene group of 1 to 10 carbons. $A_{30}$ is a monovalent organic functional group of steroid-containing group of 17 to 40 carbons.

Preferably, the diamine compound having a structure of formula (III-26) includes the diamine compound having a structure of formula (III-26-1) to (III-26-4):

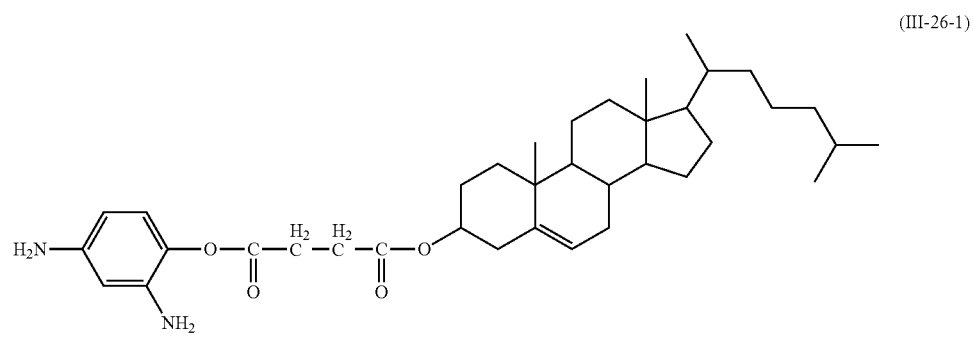
(III-26-1)

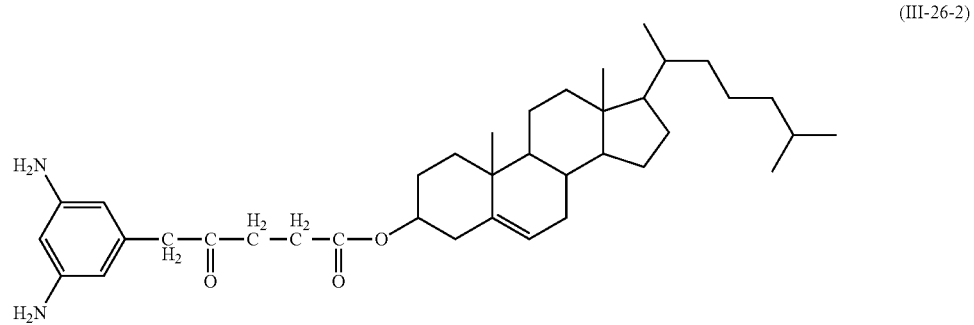
(III-26-2)

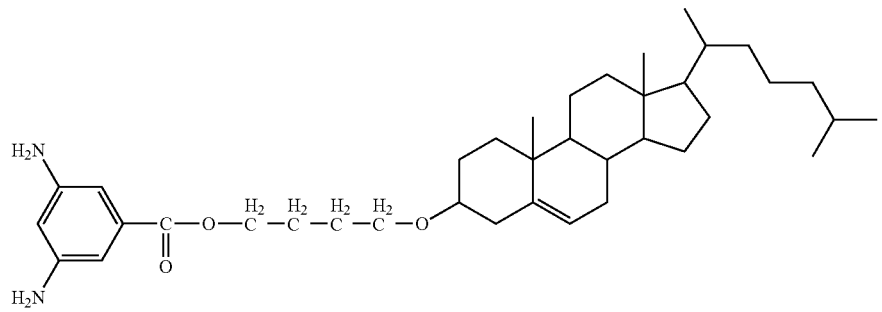

(III-26-3)

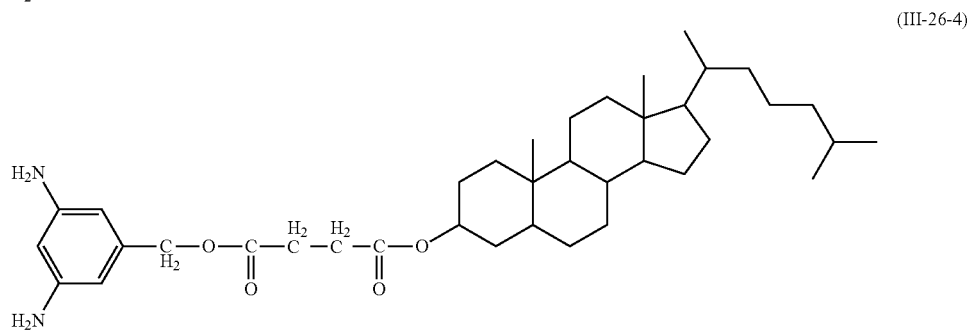

(III-26-4)

Preferably, the other diamine compound (b-2) includes but is not limited 1,2-diaminoethane, 4,4'-diaminodicyclohexylmethane, 4,4'-diaminodiphenylmethane, 4,4'-diaminodiphenylether, 5-[4-(4-n-amylcyclohexyl)cyclohexyl]phenylmethylene-1,3-diamino benzene, 1,1-bis[4-(4-aminophenoxy)phenyl]-4-(4-ethylphenyl)cyclohexane, 2,4-diaminophenyl ethyl formate, the formula (III-1-1), the formula (III-1-2), the formula (III-2-1), the formula (III-2-11), the formula (III-8-1), the formula (III-26-1), p-diaminobenzene, m-diaminobenzene, or o-diaminobenzene.

Based on the diamine compound (b) as 100 moles, an amount of the aforementioned other diamine compound (b-2) is 60 moles to 95 moles, preferably is 65 moles to 92 moles, and more preferably is 70 moles to 90 moles.

Method of Producing Polymer (A)

Method of Producing Polyamic Acid

A mixture is dissolved in a solvent, and the mixture includes a tetracarboxylic dianhydride compound (a) and a diamine compound (b). A polycondensation reaction is performed at 0° C. to 100° C. After 1 hr to 24 hrs, the aforementioned reacting solution is subjected to a reduced pressure distillation by an evaporator, or the aforementioned reacting solution was poured into a great quantity poor solvent to obtain a precipitate. Then, the precipitate is dried by a method of reduced pressure drying to produce polyamic acid.

Based on the diamine compound (b) as 100 moles, the amount of the tetracarboxylic dianhydride compound (a) preferably is 20 moles to 200 moles, and more preferably is 30 moles to 120 moles.

The solvent used in the polycondensation reaction can be the same as or different from the solvent in the liquid crystal alignment agent. The solvent used in the polycondensation reaction does not have any special limitations. The solvent needs to dissolve the reactant and the product. Preferably, the solvent includes but is not limited (1) aprotic solvent, such as N-methyl-2-pyrrolidinone (NMP), N,N-dimethylacetamide, N,N-dimethylformamide, dimethylsulfoxide, γ-butyrolactone, tetramethylurea, hexmethyl phosphoric acid triamino and the like; (2) phenolic solvent, such as m-cresol, xylenol, phenol, halogenated phenol and the like. Based on the mixture as 100 parts by weight, the amount of the solvent used in the polycondensation reaction preferably is 200 to 2000 parts by weight, and more preferably is 300 to 1800 parts by weight.

Particularly, in the polycondensation reaction, the solvent can combine with suitable poor solvent. The formed polyamic acid won't precipitate in the poor solvent. The poor solvent can be used alone or in combination of two or more, and the poor solvent includes but is not limited (1) alcohols, such as methanol, ethanol, isopropanol, cyclohexanol, ethylene glycol, propylene glycol, 1,4-butanediol, triethyleneglycol and the like; (2) ketone, such as acetone, methyl ethyl ketone, methyl isobutyl ketone, cyclohexanone and the like; (3) ester, such as methyl acetate, ethyl acetate, butyl acetate, diethyl oxalate, diethyl malonate, ethylene glycol monoethyl ether acetate and the like; (4) ether, such as diethyl ether, ethylene glycol methyl ether, ethylene glycol ethyl ether, ethylene glycol n-propyl ether, ethylene glycol isopropyl ether, ethylene glycol n-butyl ether, ethylene glycol dimethyl ether, diethylene glycol dimethyl ether and the like; (5) halohydrocarbon, such as dichloromethane, 1,2-dichloro ethane, 1,4-dichloro butane, trichloroethane, chlorobenzene, m-dichlorobenzene and the like; (6) hydrocarbon, such as tetrahydrofuran, hexane, heptane, octane, benzene, toluene, xylene and the like, or a combination thereof. Based on the diamine compound (b) as 100 parts by weight, the amount of the poor solvent preferably is 0 to 60 parts by weight, and more preferably is 0 to 50 parts by weight.

Method of Producing Polyimide

A mixture is dissolved in a solvent, and a polymerization reaction is performed to form polyamic acid. The aforementioned mixture includes a tetracarboxylic dianhydride compound (a) and a diamine compound (b). Then, polyamic acid is heated to subject a dehydration ring-closure reaction in the presence of a dehydrating agent and a catalyst. The amic acid group of the polyamic acid is converted to an imide group by the dehydration ring-closure reaction, that is to say imidization, so as to form polyimide.

The solvent used in the dehydration ring-closure reaction can be the same as the solvent in the liquid crystal alignment agent and is not illustrated any more here. Based on polyamic acid as 100 parts by weight, the amount of the solvent used in the dehydration ring-closure reaction preferably is 200 to 2000 parts by weight, and more preferably is 300 to 1800 parts by weight.

The operating temperature of the dehydration ring-closure reaction preferably is 40° C. to 200° C. for getting a better imidization ratio of the polyamic acid. More preferably, the aforementioned temperature is 40° C. to 150° C. When the operating temperature of the dehydration ring-closure reaction is lower than 40° C., the reaction is incomplete, thereby lowering the imidization ratio of the polyamic acid. However, when the operating temperature is higher than 200° C., the weight-average molecular weight of the polyimide is lower.

The imidization ratio of the polymer (A) is 30% to 90%, preferably is 35% to 85%, and more preferably is 40% to 80%. When the imidization ratio of the polymer (A) is 30% to 90%, the liquid crystal alignment agent can improve the pretilt angle stability of the liquid crystal display element.

The dehydrating agent used in the dehydration ring-closure reaction is selected from the group consisting of acid anhydride compound. For example, the acid anhydride compound is acetic anhydride, propionic anhydride, trifluoroacetic anhydride and the like. Based on the polyamic acid as 1 mole, the amount of the dehydrating agent is 0.01 mole to 20 moles. The catalyst used in the dehydration ring-closure reaction is selected from (1) pyridine compound, such as pyridine, trimethylpyridine, dimethylpyridine and the like; (2) tertiary amine compound, such as triethyl amine and the like. Based on the dehydrating agent as 1 mole, the amount of the catalyst is 0.5 mole to 10 moles.

Method of Producing Polyimide Series Block Copolymer

The polyimide series block-copolymer is selected from the group consisting of the polyamic acid block-copolymer, polyimide block-copolymer, polyamic acid-polyimide block copolymer and a combination thereof.

Preferably, a starting material is firstly dissolved in a solvent, and a polycondensation reaction is performed to produce the polyimide series block-copolymer. The starting material includes at least one aforementioned polyamic acid and/or at least one aforementioned polyimide, and the starting material further comprises a tetracarboxylic dianhydride compound (a) and a diamine compound (b).

The tetracarboxylic dianhydride compound (a) and the diamine compound (b) in the starting material are the same as the tetracarboxylic dianhydride compound (a) and the diamine compound (b) used in the method of producing aforementioned polyamic acid. The solvent used in the polycondensation reaction is the same as the solvent in the liquid crystal alignment agent and is not illustrated any more here.

Based on the starting material as 100 parts by weight, the solvent used in the polymerization reaction preferably is 200 to 2000 parts by weight, and more preferably is 300 to 1800 parts by weight. The operating temperature of the polymerization reaction preferably is 0° C. to 200° C., and more preferably is 0° C. to 100° C.

Preferably, the starting material includes but is not limited (1) two polyamic acid having different terminal groups and different structures; (2) two polyimide having different terminal groups and different structures; (3) the polyamic acid and the polyimide that have different terminal groups and different structures; (4) the polyamic acid, the tetracarboxylic dianhydride compound and the diamine compound, and the structure of the at least one of the tetracarboxylic dianhydride compound and the diamine compound is different from the structures of the tetracarboxylic dianhydride compound and the diamine compound that are used to form the polyamic acid; (5) the polyimide, the tetracarboxylic dianhydride compound and the diamine compound, and the structure of the at least one of the tetracarboxylic dianhydride compound and the diamine compound is different from the structures of the tetracarboxylic dianhydride compound and the diamine compound that are used to form the polyimide; (6) the polyamic acid, the polyimide, the tetracarboxylic dianhydride compound and the diamine compound, and the structure of the at least one of the tetracarboxylic dianhydride compound and the diamine compound is different from the structures of the tetracarboxylic dianhydride compound and the diamine compound that are used to form the polyamic acid or the polyimide; (7) two polyamic acid, tetracarboxylic dianhydride compounds or diamine compounds, and they have different structures; (8) two polyimide, tetracarboxylic dianhydride compounds or diamine compounds, and they have different structures; (9) two polyamic is acid and a diamine compounds, and the two polyamic acid have different structures and the terminal groups of the polyamic acid are acetic anhydride groups (10) two polyamic acid and a tetracarboxylic dianhydride compound, and the two polyamic acid have different structures and the terminal groups of the polyamic acid are amine groups; 11) two polyimide and a diamine compound, and the two polyimide have different structures and the terminal groups of the polyimide are acid anhydride groups; (12) two polyimide and a tetracarboxylic dianhydride compound, and the two polyimide have different structures and the terminal groups of the polyimide are amine groups.

Preferably, the polyamic acid, the polyimide and the polyimide block, copolymer can be terminal-modified polymer after adjusting the molecular weight without departing from the efficiency of the present invention. The terminal-modified polymer can improve a coating ability of the liquid crystal alignment agent. When the polymerization reaction of the polyamic acid is performed, a compound having a monofunctional group is added to produce the terminal-modified polymer. The monofunctional group includes but not limited (1) monoacid anhydride, such as maleic anhydride, phthalic anhydride, Itaconic anhydride, n-decyl succinic anhydride, n-dodecyl succinic anhydride, n-tetradecyl succinic anhydride, n-hexadecyl succinic anhydride and the like; (2) monoamine compound, such as aniline, cyclohexaylamine, n-butylamine, n-pentylamine, n-hexylamine, n-heptylamine, n-octylamine, n-nonylamine, n-decylamine, n-undecylamine, n-dodecylamine, n-tridecylamine, n-tetradecylamine, n-pentadecylamine, n-hexadecylamine, n-heptadecylamine, n-octadecylamine, n-eicosylamine and the like; (3) monoisocyanate compound, such as phenyl isocyanate, naphthyl isocyanate and the like.

Solvent (B)

Preferably, the solvent (B) is N-methyl-2-pyrrolidone, γ-butyrolactone, γ-butyrolactam, 4-hydroxyl-4-methyl-2-pentanone, ethylene glycol monomethyl ether, butyl lactate, butyl acetate, methylmethoxypropionate, ethylethoxypropionate, ethylene glycol methyl ether, ethylene glycol ethyl ether, ethylene glycol n-propyl ether, ethylene glycol isopropyl ether, ethylene glycol n-butyl ether, ethylene glycol dimethyl ether, ethylene glycol ethyl ether acetate, diglycol dimethyl ether, diglycol diethyl ether, diglycol monomethyl ether, diglycol monoethyl ether, diglycol monomethyl ether aceatte, diglycol monoethyl ether aceate, N,N-dimethylformamide, N,N-dimethylethanamide and the like. The solvent (B) can be used alone or in combination of two or more.

Additive (C)

The liquid crystal alignment agent can selectively include an additive (C) without departing from the efficiency of the present invention. The additive (C) is an epoxy compound or a functional group-containing silane compound. The additive (C) can raise the adhesion between the liquid crystal alignment film and the surface of the substrate. The additive (C) can be used alone or in combination of two or more.

The epoxy compound includes but is not limited ethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, 2,2-dibromo-neopentyl diglycidyl ether, 1,3,5,6-tetraglycidyl-2,4-hexanediol, N,N,N',N'-tetraglycidyl-m-xylene diamine, 1,3-bis(N,N-diglycidylaminomethyl)cyclohexane, N,N,N',N'-tetraglycidyl-4,4'-diaminodiphenylmethane, N,N-glycidyl-p-glycidoxy aniline, 3-(N-allyl-N-glycidyl)aminopropyltrimethoxyl silane, 3-(N,N-diglycidyl)aminopropyl trimethoxyl silane and the like.

Based on the polymer (A) as 100 parts by weight, the amount of the epoxy compound is less than 40 parts by weight, and preferably is 0.1 parts by weight to 30 parts by weight.

The functional group-containing silane compound includes but is not limited to 3-aminopropyl trimethoxy silane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3-aminopropylmethyldimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-triethoxysilylpropyltriethylene triamine, N-trimethoxysilylpropyltriethylenetriamine, 10-trimethoxysilyl-1,4,7-triazadecane, 10-triethoxysilyl-1,4,7-triazadecane, 9-trimethoxysilyl-3,6-diazanonylacetate, 9-triethoxysilyl-3,6-diazanonylacetate, N-benzyl-3-aminopropyltrimethoxysilane, N-benzyl-3-aminopropyltriethoxysilane, N-phenyl-3-aminopropyltrimethoxysilane, N-phenyl-3-aminopropyl triethoxysilane, N-bis(oxyethylene)-3-aminopropyltrimethoxysilane, N-bis(oxyethylene)-3-aminopropyltriethoxysilane and the like.

Based on the polymer (A) as 100 parts by weight, the amount of the silane-containing compound is less than 10 parts by weight, and preferably is 0.5 parts by weight to 10 parts by weight.

Producing Liquid Crystal Alignment Agent

The liquid crystal alignment agent of the present invention is produced by a conventional mixing method. For example, the tetracarboxylic dianhydride compound (a) and the diamine compound (b) are mixed uniformly to produce the polymer (A). Then, the polymer (A) is added to the solvent (B) at 0° C. to 200° C. in a mixer until all compositions are mixed uniformly, and the additive (C) is selectively added. Preferably, the solvent (B) is added into the polymer (A) at 20° C. to 60° C.

Preferably, at 25° C. a viscosity of the liquid crystal alignment agent is 15 cps to 35 cps, preferably is 17 cps to 33 cps, and more preferably is 20 cps to 30 cps.

Producing Liquid Crystal Alignment Film

The producing method of the liquid crystal alignment film comprises the following steps. The aforementioned liquid crystal alignment agent firstly is coated on a surface of a substrate to form a coating film by a roller coating, a spin coating, a printing coating, an ink-jet printing and the like. Then, a pre-bake treatment, a post-bake treatment and an alignment treatment are subject to the coating film to produce the liquid crystal alignment film.

An organic solvent in the coating film is volatilized by the aforementioned pre-bake treatment. The operating temperature of the pre-bake treatment is 30° C. to 120° C., preferably is 40° C. to 110° C., and more preferably is 50° C. to 100° C.

The alignment treatment does not have any limitations. The liquid crystal alignment film is rubbed along a desired direction with a roller that is covered with a cloth made from fibers such as nylon, rayon, cotton and the like. The aforementioned alignment treatment is widely known rather than focusing or mentioning them in details.

The polymer in the coating film is further subjected to the dehydration ring-closure (imidization) reaction by the post-bake treatment. The operating temperature of the post-bake treatment is 150° C. to 300° C., preferably is 180° C. to 280° C., and more preferably is 200° C. to 250° C.

Producing Method of Liquid Crystal Display Element

The producing method of the liquid crystal display element is widely known rather than focusing or mentioning them in details.

Reference is made to FIG. 1, which is a cross-sectional diagram of a liquid crystal display element according to the present invention. In a preferable example, the liquid crystal display element 100 includes a first unit 110, a second unit 120 and a liquid crystal unit 130. The second unit 120 is spaced apart opposite the first unit 110, and the liquid crystal unit 130 is disposed between the first unit 110 and the second unit 120.

The first unit 110 includes a first substrate 111, a first conductive film 113 and a first liquid crystal alignment film 115. The first conductive film 113 is disposed on a surface of the first substrate 111, and the first liquid crystal alignment film 115 is disposed on a surface of the first conductive film 113.

The second unit 120 includes a second substrate 121, a second conductive film 123 and a second liquid crystal alignment film 125. The second conductive film 123 is disposed on a surface of the second substrate 121, and the second liquid crystal alignment film 125 is disposed on a surface of the second conductive film 123.

The first substrate 111 and the second substrate 121 are selected from a transparent material and the like. The transparent material includes but is not limited an alkali-free glass, a soda-lime glass, a hard glass (Pyrex glass), a quartz glass, polyethylene terephthalate, polybutylene terephthalate, polyethersulfone, polycarbonate and the like. The materials of the first conductive film 113 and the second conductive film 123 are selected from tin oxide ($SnO_2$), indium oxide-tin odide ($In_2O_3$—$SnO_2$) and the like.

The first liquid crystal alignment film 115 and the second liquid crystal alignment film 125 respectively are the aforementioned liquid crystal alignment films, which can provide the liquid crystal unit 130 with a pretilt angle. The liquid crystal unit 130 is driven by an electric field induced by the first conductive film 113 and the second conductive film 123.

A liquid crystal material used in the liquid crystal unit 130 can be used alone or in combination of two or more. The liquid crystal material includes but is not limited 1,4-diaminobenzene liquid crystal, pyridazine liquid crystal, Shiff Base liquid crystal, azoxy liquid crystal, biphenyl liquid crystal, phenyl cyclohexane liquid crystal, ester liquid crystal, terphenyl liquid crystal, biphenyl cyclohexane liquid crystal, pyrimidine liquid crystal, dioxane liquid crystal, bicyclooctane liquid crystal, cubane liquid crystal and the like. Optionally, the liquid crystal material includes cholesterol liquid crystal, such as cholesteryl chloride, cholesteryl nonanoate, cholesteryl carbonate and the like; chiral agent, such as products made by Merck Co. Ltd., and the trade name are C-15 and CB-15; ferroelectric liquid crystal, such as p-decoxyl benzilidene-p-amino-2-methyl butyl cinnamate and the like.

Several embodiments are described below to illustrate the application of the present invention. However, these embodiments are not used for the present invention. For those skilled in the art of the present invention, various variations and modifications can be made without departing from the spirit and scope of the present invention.

BRIEF DESCRIPTION OF THE DRAWINGS

The invention can be more fully understood by reading the following detailed description of the embodiment, with reference made to the accompanying drawings as follows:

FIG. 1 is a cross-sectional diagram of a liquid crystal display element according to the present invention.

DETAILED DESCRIPTION

Producing Diamine Compound Having a Structure of Formula (I)

Producing Example

The compound (b-1-1) [the diamine compound having a structure of formula (I-5)] was produced according to Scheme 1 as follows.

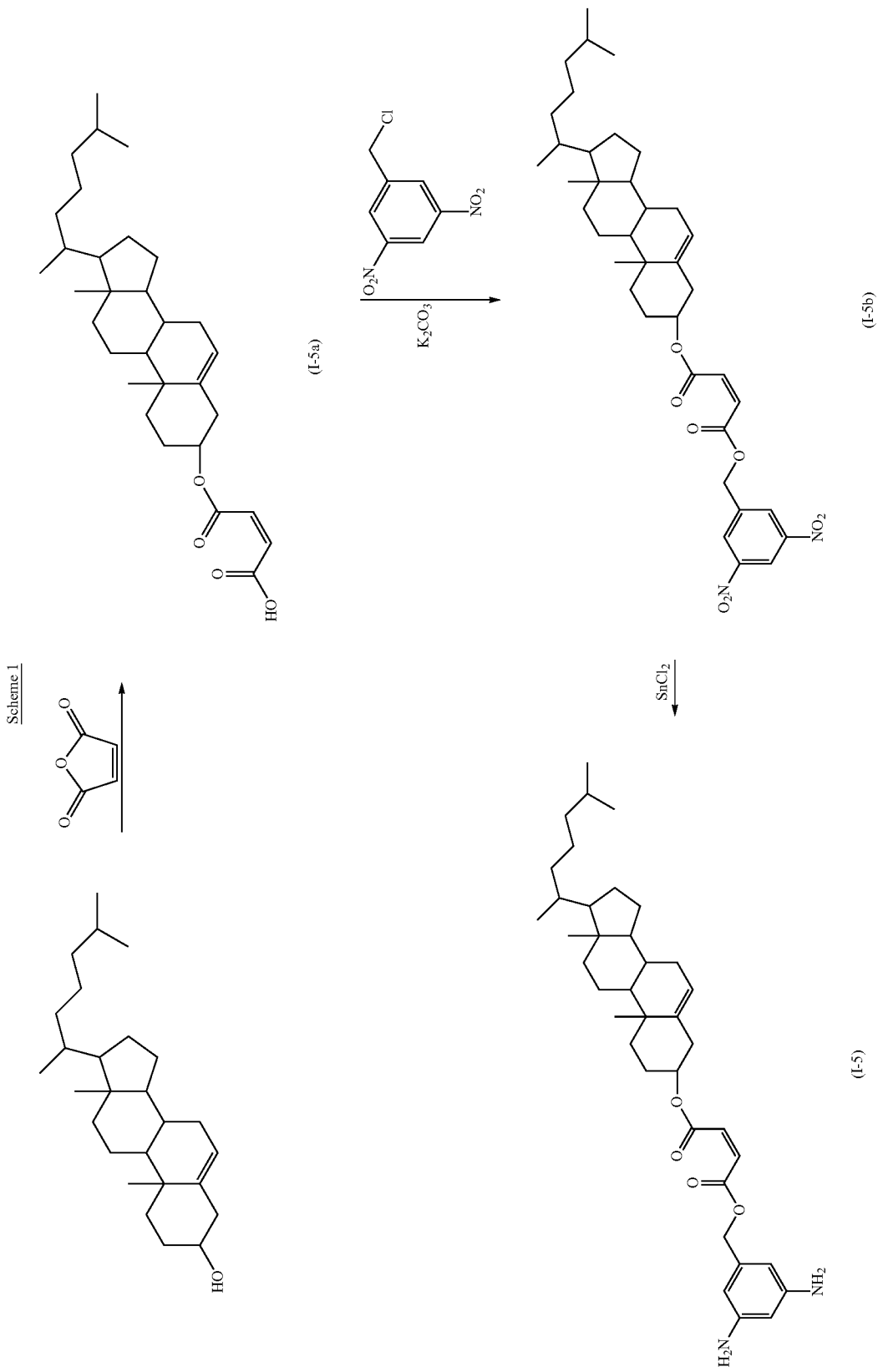
Scheme 1

A 5000 ml three-necked conical flask equipped with a nitrogen inlet, a stirrer, and a thermometer was purged with nitrogen. Then, 387 g of cholesterol, 197 g of maleic anhydride, 20 g of N,N-dimethylaminopyridine, 160 ml of triethylamine and 2100 ml of ethyl acetate were added to react at 90° C. After 9 hours, ethyl acetate was removed by distillation in reduced pressure. Next, 2100 ml of chloroform was added to form an organic layer and a water layer. The organic layer was washed by dilute hydrochloric acid trice, and the organic layer was washed by water five times. And then, magnesium sulfate was added into the collecting organic layer for drying. The solvent was removed by rotary concentrator, so as to obtain 222 g of the compound (I-5a).

A 5000 ml three-necked conical flask equipped with a nitrogen inlet, a stirrer, and a thermometer was purged with nitrogen. Then, 222 g of the aforementioned compound (I-5a), 109 g of 3,5-dinitrobenzoyl chloride, 206 g of potassium carbonate, 150 g of sodium iodide and 1600 ml N,N-dimethylformamide were added to react at 65° C. After 8 hours, 3200 ml of chloroform was added to form an organic layer and a water layer. The organic layer was washed by water five times. Next, magnesium sulfate was added into the collecting organic layer for drying. And then, a precipitate was obtained by rotary concentrator, and the precipitate was washed by ethanol twice, so as to obtain 278 g of the compound (I-5b).

A 5000 ml three-necked conical flask equipped with a nitrogen inlet, a stirrer, a condenser and a thermometer was purged with nitrogen. Then, 200 g of the aforementioned compound (I-5b), 682 g of tin chloride dihydrate and 1900 ml of ethyl acetate were added to react at reflux temperature. After 5 hours, the reacting mixture was washed by potassium chloride solution trice, and then washed by water four times, so as to form an organic layer. Next, magnesium sulfate was added into the collecting organic layer for drying. And then, the solvent was removed by rotary concentrator, and ethanol was added to perform recrystallization, thereby obtaining 56 g of the compound (I-5, hereinafter abbreviated as b-1-1).

Producing Example 2

The compound (b-1-2) [the aforementioned diamine compound having a structure of formula (I-6)] was produced according to Scheme 2 as follows.

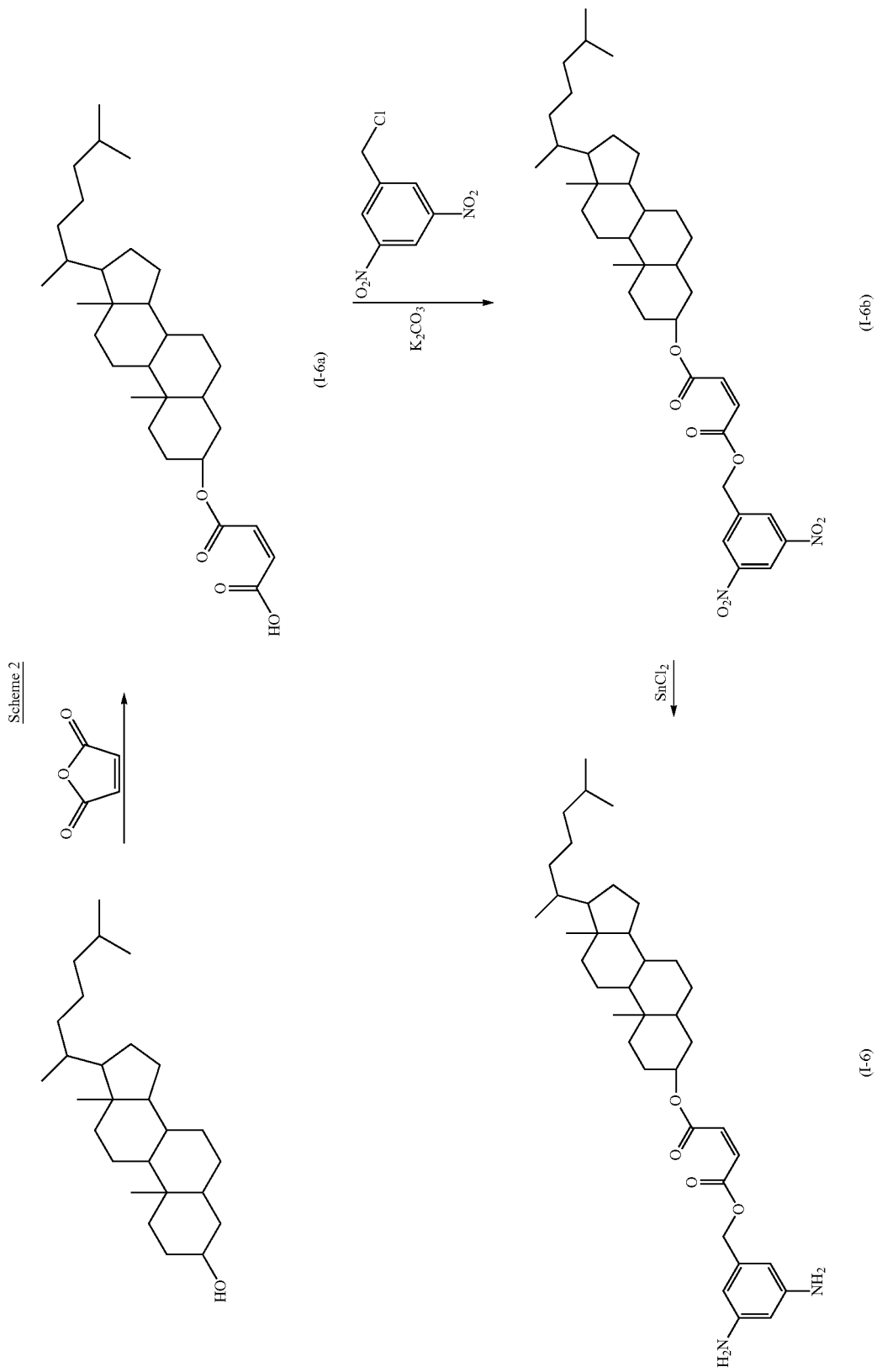

A 5000 ml three-necked conical flask equipped with a nitrogen inlet, a stirrer, and a thermometer was purged with nitrogen. Then, 389 g of cholestanol, 197 g of maleic anhydride, 18 g of N,N-dimethylaminopyridine, 180 ml of triethylamine and 2000 ml of ethyl acetate were added to react at 90° C. After 9 hours, ethyl acetate was removed by distillation in reduced pressure. Next, 2200 ml of chloroform was added to form an organic layer and a water layer. The organic layer was washed by dilute hydrochloric acid trice, and the organic layer was washed by water five times. And then, magnesium sulfate was added into the collecting organic layer for drying. The solvent was removed by rotary concentrator, so as to obtain 222 g of the compound (I-6a).

A 5000 ml three-necked conical flask equipped with a nitrogen inlet, a stirrer, and a thermometer was purged with nitrogen. Then, 222 g of the aforementioned compound (I-6a), 109 g of 3,5-dinitrobenzoyl chloride, 206 g of potassium carbonate, 150 g of sodium iodide and 1500 ml of N,N-dimethylformamide were added to react at 65° C. After 8 hours, 3100 ml of chloroform was added to form an organic layer and a water layer. The organic layer was washed by water five times. Next, magnesium sulfate was added into the collecting organic layer for drying. And then, a precipitate was obtained by rotary concentrator, and the precipitate was washed by ethanol twice, so as to obtain 278 g of the compound (I-6b).

A 5000 ml three-necked conical flask equipped with a nitrogen inlet, a stirrer, a condenser and a thermometer was purged with nitrogen. Then, 200 g of the aforementioned compound (I-6b), 682 g of tin chloride dihydrate and 2100 ml of ethyl acetate were added to react at reflux temperature. After 5.5 hours, the reacting mixture was washed by potassium chloride solution trice, and then washed by water four times, so as to form an organic layer. Next, magnesium sulfate was added into the collecting organic layer for drying. And then, the solvent was removed by rotary concentrator, and ethanol was added to perform recrystallization, thereby obtaining 57 g of the compound (I-6, hereinafter abbreviated as b-1-2).

Producing Example 3

The compound (b-1-3) [the diamine compound having a structure of formula (I-16)] was produced according, to Scheme 3 as follows

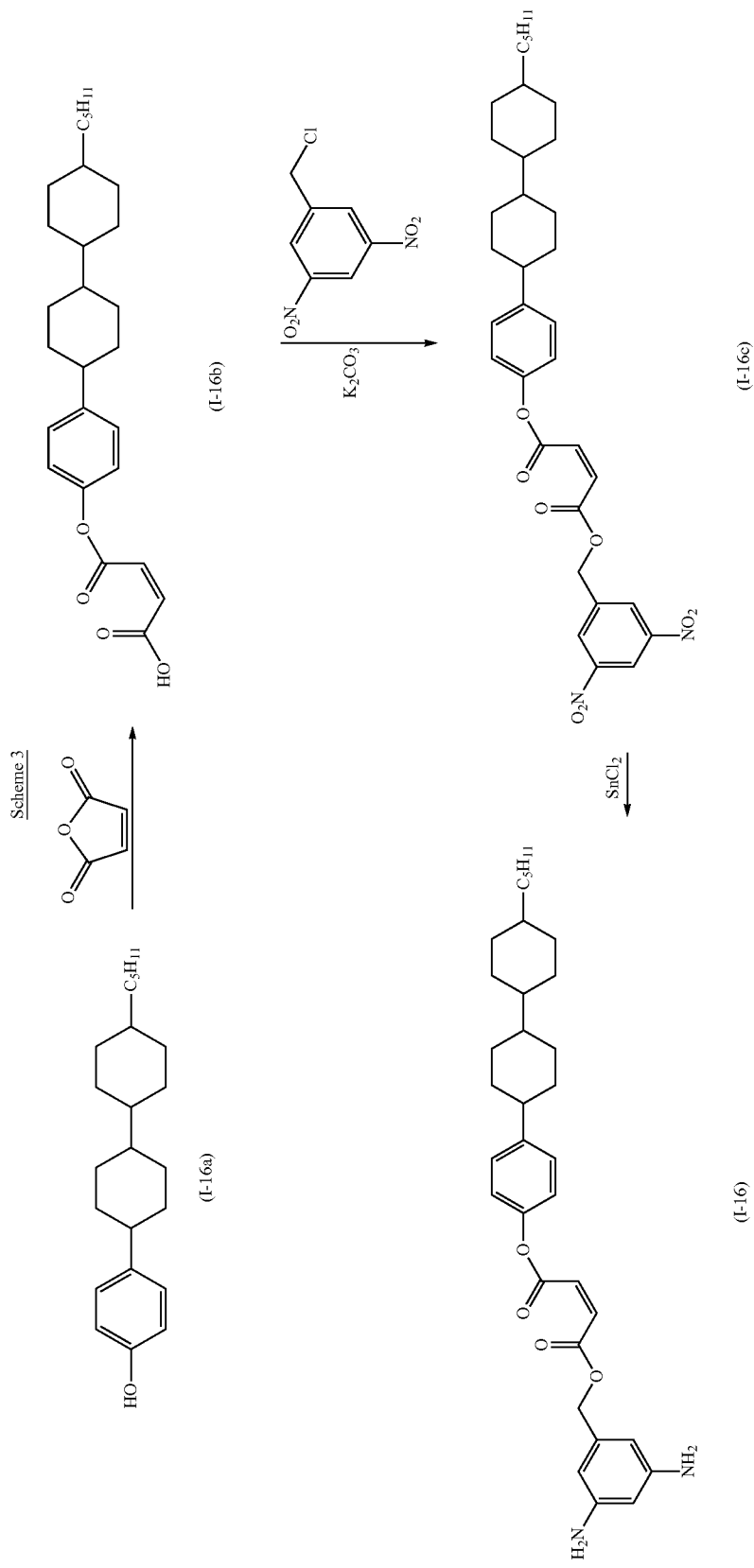

A 5000 ml three-necked conical flask equipped with a nitrogen inlet, a stirrer, and a thermometer was purged with nitrogen. Then, 105 g of compound (I-16a), 59 g of maleic anhydride, 4.5 g of N,N-dimethylaminopyridine, 50 ml of methylamine and 500 ml of ethyl acetate were added to react at 90° C. After 9 hours, ethyl acetate was removed by distillation in reduced pressure. Next, 2100 ml of chloroform was added to form an organic layer and a water layer. The organic layer was washed by dilute hydrochloric acid trice, and the organic layer was washed by water five times. And then, magnesium sulfate was added into the collecting organic layer for drying. The solvent was removed by rotary concentrator, so as to obtain 96 g of the compound (I-16b).

A 5000 ml three-necked conical flask equipped with a nitrogen inlet, a stirrer, and a thermometer was purged with nitrogen. Then, 75 g of the aforementioned compound (I-16b), 44 g of 3,5-dinitrobenzoyl chloride, 82 g of potassium carbonate, 60 g of sodium iodide and 600 ml of N,N-dimethylformamide were added to react at 65° C. After 8 hours, 3200 ml of chloroform was added to form an organic layer and a water layer. The organic layer was washed by water five times. Next, magnesium sulfate was added into the collecting organic layer for drying. And then, a precipitate was obtained by rotary concentrator, and the precipitate was washed by ethanol twice, so as to obtain 86 g of the compound (I-16c).

A 2000 ml three-necked conical flask equipped with a nitrogen inlet, a stirrer, a condenser and a thermometer was purged with nitrogen. Then, 80 g of the aforementioned compound (I-16c), 338 g of tin chloride dihydrate and 1200 ml of ethyl acetate were added to react at reflux temperature. After 5 hours, the reacting mixture was washed by potassium chloride solution trice, and then washed by water four times, so as to form an organic layer. Next, magnesium sulfate was added into the collecting organic layer for drying. And then, the solvent was removed by rotary concentrator, and ethanol was added to perform recrystallization, thereby obtaining 48 g of the compound (I-16, hereinafter abbreviated as b-1-3).

Producing Polymer (A)

The Polymer (A) of Synthesis Examples A-1-1 to A-1-3 were according to Table 1 as follows.

Synthesis Example A-1-1

A 500 ml three-necked conical flask equipped with a nitrogen inlet, a stirrer, a condenser and a thermometer was purged with nitrogen. Then, 9.06 g (0.015 mole) of the diamine compound (b-1-1) having a structure of formula (I-5), 3.78 g (0.035 mole) of p-diaminobenzene (b-2-1) and 80 g of NMP were mixed uniformly at room temperature. Next, 10.91 g (0.05 mole) of pyromellitic dianhydride and 20 g of NMP were added and left to react for 2 hours at room temperature. When the reaction is completed, the reacting solution was poured into 1500 ml of water to precipitate the polymer. The polymer obtained after filtering was repeatedly washed using methanol and filtered thrice, and then placed into a vacuum oven, where drying was carried out at 60° C., thereby obtaining a polymer (A-1-1). An imidization ratio of the resulted polymer (A-1-1) was evaluated according to the following evaluation method, and the result thereof was listed as Table 1. The evaluation method of the imidization ratio was described as follows.

Synthesis Examples A-1-2, A-1-3 and A-3-1

Synthesis Examples A-1-2, A-1-3 and A-3-1 were practiced with the same method as in Synthesis Example A-1-1 by using various kinds or amounts of the components for the polymer. The formulations and detection results thereof were listed in Table 1 rather than focusing or mentioning them in details.

Synthesis Example A-2-1

A 500 ml three-necked conical flask equipped with a nitrogen inlet a stirrer, a heater, a condenser and a thermometer was purged with nitrogen. Then; 9.06 g (0.015 mole) of the diamine compound (b-1-1) having a structure of formula (I-5) 3.78 g (0.035 mole) of p-diaminobenzene (b-2-1) and 80 g of NMP were mixed uniformly at room temperature. Next, 10.91 g (0.05 mole) of pyromellitic dianhydride and 20 g of NMP were added and left to react for 6 hours at room temperature. And then, 97 g of NMP, 3.57 g of acetic anhydride and 19.75 g of pyridine were added at 60° C. and left to stir for 2 hours for imidization reaction. When the reaction is completed, the reacting solution was poured into 1500 ml of water to precipitate the polymer. The polymer obtained after filtering was repeatedly washed using methanol and filtered thrice, and then placed into a vacuum oven, where drying was carried out at 60° C., thereby obtaining a polymer (A-2-1). An imidization ratio of the resulted polymer (A-2-1) was evaluated according to the following evaluation method, and the result thereof was listed as Table 1.

Synthesis Examples A-2-2 to A-2-8 and Synthesis Examples A-2 and A-3-3

Synthesis Examples A-2-2 to A-2-8 and Synthesis Examples A-3-2 and A-3-3 were practiced with the same method as in Synthesis Example A-2-1 by using various kinds or amounts of the compositions for the polyimide. The formulations and detection results thereof were listed in Table 1 rather than focusing or mentioning them in details.

Producing Liquid Crystal Alignment Agent

Hereinafter, the liquid crystal alignment agent of Examples 1 to 10 and Comparative Examples 1 to 3 were according to Table 2 as follows.

Example 1

100 parts by weight of the polymer (A-1-1) was added into 1200 parts by weight of N-methyl-2-pyrrolidinone (hereinafter abbreviated as B-1) and 600 parts by weight of ethylene glycol n-butyl ether (hereinafter abbreviated as B-2) for mixing, in a mixer until all compounds were mixed uniformly at room temperature, thereby obtaining the liquid crystal alignment agent of Example 1. The resulted liquid crystal alignment agent was evaluated according to the following evaluation method, and the result thereof was listed as Table 2. The evaluation methods of the pretilt angle stability was described as follows.

Examples 2 to 10 and Comparative Examples 1 to 3

Examples 2 to 10 and Comparative Examples 1 to 3 were practiced with the same method as in Example 1 by using various kinds or amounts of the compositions for the liquid crystal alignment agent. The formulations and detection results thereof were listed in Table 2 rather than focusing or mentioning them in details.

Evaluation Methods

1. Imidization Ratio

The imidization ratio refers to a ratio of the number of imide ring in the total amount of the number of amic acid functional group and the number of imide ring in the polymer (A), and the imidization ratio is presented by percentage.

After the aforementioned method of reduced pressure drying is performed, the polymer (A) of Synthesis Examples A-1-1 to A-3-3 respectively were dissolved in a suitable deuteration solvent, such as dimethyl sulfoxide. $^1$H-NMR (hydrogen-nuclear magnetic resonance) was detected at room temperature (25° C.) using tetramethylsilane as a standard, and the imidization ratio (%) was calculated according to the following formula (V):

$$\text{Imidization Ratio}(\%) = \left[1 - \frac{\Delta 1}{\Delta 2 \times \alpha}\right] \times 100\% \quad (V)$$

in the formula (V), Δ1 is the peak area of the chemical shift induced by the proton of NH group near 10 ppm, Δ2 is the peak area of other proton, and α is the ratio of one proton of NH group corresponding to the number of other proton in the polyamic acid precursor.

2. Pretilt Angle Stability

The aforementioned liquid crystal alignment agents of the Examples 1 to 10 and Comparative Examples 1 to 3 were respectively coated on two glass substrates by a printer (made by Nissha Printing Co. LTD., and the trade name is S15-036) to form two coating films, and each of the two glass substrates has a conductive film made by ITO (indium-tin-oxide) thereon. Next, the two glass substrates were disposed on a heating plate and pre-baked at 100° C. for 5 minutes. Then, the two glass substrates were placed into a circulation oven and post-baked at 220° C. for 30 minutes. And then, the glass substrates were subjected to an alignment treatment, thereby obtaining the liquid crystal alignment films on the two glass substrates.

A thermo-compression adhesive was coated on one of the aforementioned two glass substrates having the liquid crystal alignment films, and spacers with a diameter of 4 μm were spread on the other glass substrate. Next, the two glass substrates were adhered to each other, and the alignment directions of which were perpendicular to each other. The aforementioned two glass substrates were adhered by a thermo-compression machine with 10 kg of pressure at 150° C. Then, liquid crystal was injected into a gap between the two glass substrates from a liquid crystal injecting inlet by a liquid crystal injector (made by Shimadzu Corporation and the trade name is ALIS-100X-CH). The liquid crystal injecting inlet was sealed by an ultra violet curable adhesive, and the ultra violet curable adhesive was radiated with an ultra violet light for curing the ultra violet adhesive. And then, the two glass substrates was subjected to a liquid crystal annealing treatment at 60° C. in an oven for 30 minutes, thereby obtaining the liquid crystal display element.

According to the method disclosed by T. J. Scheffer et al. in 1977, published in J. Appl. Phys., vol. 48, p. 1783, a pretilt angle was measured by a liquid crystal evaluating device (made by Chuo Precision Industrial Co. LTD., and the trade name is OMS-CM4RD) with a crystal rotation method of He—Ne laser light. After the liquid crystal element was disposed at 60° C. for 240 hours, a pretilt angle ($P_{HT}$) of a central point of the liquid crystal element was measured. According the aforementioned method, a pretilt angle ($P_{RT}$) of the central point of the liquid crystal element was measured at room temperature. The pretilt angle stability (S) was calculated according to the following formula (VI), and an evaluation was made according to the following criterion:

$$S(\%) = \frac{P_{HT} - P_{RT}}{P_{RT}} \times 100\% \quad (VI)$$

◎: S<0.5%.
○: 0.5%≤S<1.0%
Δ: 1.0%≤S<1.5%
X: 1.5%≤S

According to Table 1 and Table 2, when the liquid crystal alignment comprises the diamine compound (b-1) having a structure of formula (I), the liquid crystal alignment agent has an excellent pretilt angle stability.

Moreover, when the imidization ratio of the polymer (A) is 30% to 90%, the polymer (A) can further improve the pretilt angle stability of the crystal alignment agent.

It should be supplemented that, although specific compounds, components, specific reactive conditions, specific processes, specific evaluation methods or specific equipments are employed as exemplary embodiments of the present invention, for illustrating the liquid crystal alignment agent, the liquid crystal alignment film and the liquid crystal display element having thereof of the present invention. However, as is understood by a person skilled in the art instead of limiting to the aforementioned examples, the liquid crystal alignment agent, the liquid crystal alignment film and the liquid crystal display element having thereof of the present invention also can be manufactured by using other compounds, components, reactive conditions, processes, analysis methods and equipment without departing from the spirit and scope of the present invention.

As is understood by a person skilled in the art, the foregoing preferred embodiments of the present invention are illustrated of the present invention rather than limiting of the present invention. In view of the foregoing, it is intended to cover various modifications and similar arrangements included within the spirit and scope of the appended claims. Therefore, the scope of which should be accorded the broadest interpretation so as to encompass all such modifications and similar structure.

TABLE 1

| Compositions (mole %) | | Synthesis Example | | | | | | | | | | | | |
|---|---|---|---|---|---|---|---|---|---|---|---|---|---|---|
| | | A-1-1 | A-1-2 | A-1-3 | A-2-1 | A-2-2 | A-2-3 | A-2-4 | A-2-5 | A-2-6 | A-2-7 | A-2-8 | A-3-1 | A-3-2 | A-3-3 |
| Tetracarboxylic Dianhydride Compound (a) | a-1 | 100 | | | 100 | | | | | 100 | 50 | | 100 | | |
| | a-2 | | 100 | | | 100 | | 100 | 50 | | 50 | 70 | | 100 | |
| | a-3 | | | 100 | | | 100 | | 50 | | | 30 | | | 100 |
| Diamine Compound (b) | Diamine Compound (b-1) Having a Structure of Formula (I) | b-1-1 | 30 | | | 30 | | | | | 40 | 15 | | | | |
| | | b-1-2 | | 5 | | | 5 | | 15 | 10 | | 20 | | | | |
| | | b-1-3 | | | 15 | | | 15 | | 20 | | | 10 | | | |
| | Other Diamine Compound (b-2) | b-2-1 | 70 | | | 70 | | | | | 50 | | 80 | 70 | 15 | 90 |
| | | b-2-2 | | 90 | 85 | | 90 | 85 | 70 | | 10 | | | 70 | | |
| | | b-2-3 | | | | | | | | 70 | | 65 | | | | |
| | | b-2-4 | | 5 | | | 5 | | 15 | | | 10 | | | | 10 |

TABLE 1-continued

| Compositions (mole %) | Synthesis Example | | | | | | | | | | | | | |
|---|---|---|---|---|---|---|---|---|---|---|---|---|---|---|
| | A-1-1 | A-1-2 | A-1-3 | A-2-1 | A-2-2 | A-2-3 | A-2-4 | A-2-5 | A-2-6 | A-2-7 | A-2-8 | A-3-1 | A-3-2 | A-3-3 |
| b-2-5 | | | | | | | | | | | | 30 | | |
| b-2-6 | | | | | | | | | | | | | 15 | |
| Imidization Ratio (%) | 0 | 0 | 0 | 23 | 30 | 41 | 52 | 63 | 78 | 90 | 94 | 0 | 52 | 85 | a-1 pyromellitic dianhydride
a-2 1,2,3,4-cyclobutane tetracarboxylic dianhydride
a-3 2,3,5-tricarboxy cyclopentyl acetic acid dianhydride
b-1-1 diamine compound having a structure of formula (I-5)
b-1-2 diamine compound having a structure of formula (I-6)
b-1-3 diamine compound having a structure of formula (I-16)
b-2-1 p-diaminobenzene
b-2-2 4,4'-diaminodiphenylmethane
b-2-3 4,4'-diaminodiphenylether
b-2-4 diamine compound having a structure of formula (III-1-6)
b-2-5 diamine compound having a structure of formula (III-2-2)
b-2-6 diamine compound having a structure of formula (III-26-1)

TABLE 2

| Compositions (Parts by Weight) | | Example | | | | | | | | | | Comparative Example | | |
|---|---|---|---|---|---|---|---|---|---|---|---|---|---|---|
| | | 1 | 2 | 3 | 4 | 5 | 6 | 7 | 8 | 9 | 10 | 1 | 2 | 3 |
| Polymer (A) | A-1-1 | 100 | | | | | | | | | | | | |
| | A-1-2 | | 100 | | | | | | | | | | | |
| | A-1-3 | | | 100 | | | | | | | | | | |
| | A-2-1 | | | | 100 | | | | | | | | | |
| | A-2-2 | | | | | 100 | | | | | | | | |
| | A-2-3 | | | | | | 100 | | | | | | | |
| | A-2-4 | | | | | | | 100 | | | | | | |
| | A-2-5 | | | | | | | | 100 | | | | | |
| | A-2-6 | | | | | | | | | 50 | | | | |
| | A-2-7 | | | | | | | | | 50 | | | | |
| | A-2-8 | | | | | | | | | | 100 | | | |
| | A-3-1 | | | | | | | | | | | 100 | | |
| | A-3-2 | | | | | | | | | | | | 100 | |
| | A-3-3 | | | | | | | | | | | | | 100 |
| Solvent (B) | B-1 | 1200 | | 800 | | | 1500 | 900 | 850 | 1400 | | 1200 | | |
| | B-2 | 600 | 1600 | | 800 | 1500 | | 600 | 850 | | 1000 | 600 | 1600 | |
| | B-3 | | | 1000 | 800 | 500 | 800 | 600 | | | 350 | | | 2400 |
| Additive (C) | C-1 | | | 3 | | | | | | 1 | | | | |
| | C-2 | | | | | 0.5 | | | | 2 | | | | |
| Evaluation Method | Pretilt Angle Stability | ○ | ○ | ○ | ○ | ◎ | ◎ | ◎ | ◎ | ◎ | ○ | X | X | X |

B-1 N-methyl-2-pyrrolidinone
B-2 ethylene glycol n-butyl ether
B-3 γ-butyrolactone
C-1 N,N,N',N'-tetraglycidyl-4,4'-diaminodiphenylmethane
C-2 N,N-glycidyl-p-glycidoxy aniline

What is claimed is:

1. A liquid crystal alignment agent, comprising:

a polymer (A), synthesized by reacting a mixture that includes a tetracarboxylic dianhydride compound (a) and a diamine compound (b); and a solvent (B); and wherein the diamine compound (b) includes a diamine compound (b-1) having a structure of formula (I), and based on the diamine compound (b) as 100 moles, an amount of the diamine compound (b-1) is 5 moles to 40 moles:

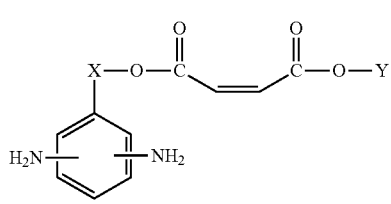

in the formula (I), X is an alkylene group of 1 to 12 carbons;
Y is a steroid-containing group or a structure of formula (II):

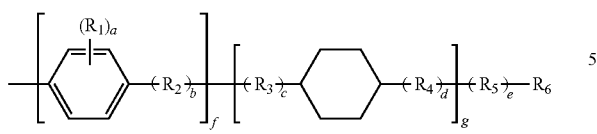

in the formula (II), $R_1$ is a hydrogen atom, a fluoro atom or a methyl group; $R_2$, $R_3$ and $R_4$ respectively are a single bond,

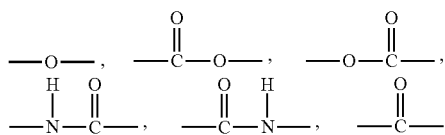

or an alkylene group of 1 to 3 carbons; $R_5$ is

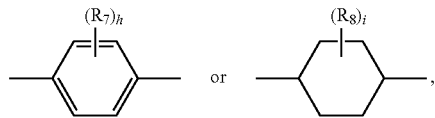

wherein $R_7$ and $R_8$ respectively are a hydrogen atom, a fluoro atom or a methyl group; $R_6$ is a hydrogen atom, a fluoro atom, an alkyl group of 1 to 12 carbons, a fluoroalkyl group of 1 to 12 carbons, an alkoxyl group of 1 to 12 carbons, —$OCH_2F$, —$OCHF_2$ or —$OCF_3$; a is 1 or 2; b, c and d respectively are an integer of 0 to 4; e, f and g respectively are an integer of 0 to 3, and e+f+g≥1; h and i respectively are 1 or 2; and when $R_1$, $R_2$, $R_3$, $R_4$, $R_5$, $R_7$ or $R_8$ are pluralities, $R_1$, $R_2$, $R_3$, $R_4$, $R_5$, $R_7$ or $R_8$ respectively are the same or different.

2. The liquid crystal alignment agent of claim 1, based on the diamine compound (b) as 100 moles, an amount of the diamine compound (b-1) is 8 moles to 35 moles.

3. The liquid crystal alignment agent of claim 1, based on the diamine compound (b) as 100 moles, an amount of the diamine compound (b-1) is 10 moles to 30 moles.

4. The liquid crystal alignment agent of claim 1, wherein an imidization ratio of the polymer (A) is 30% to 90%.

5. A liquid crystal alignment film formed by a liquid crystal alignment agent of claim 1.

6. A liquid crystal display element comprising a liquid crystal alignment film of claim 5.

\* \* \* \* \*